US010827516B2

(12) United States Patent
Huang et al.

(10) Patent No.: US 10,827,516 B2
(45) Date of Patent: Nov. 3, 2020

(54) RESOURCE SPLITTING AMONG DIFFERENT TYPES OF CONTROL INFORMATION AND UPLINK DATA FOR A TRANSMISSION ON AN UPLINK SHARED CHANNEL

(71) Applicant: QUALCOMM Incorporated, San Diego, CA (US)

(72) Inventors: Yi Huang, San Diego, CA (US); Xiao Feng Wang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/250,691

(22) Filed: Jan. 17, 2019

(65) Prior Publication Data
US 2019/0230688 A1 Jul. 25, 2019

Related U.S. Application Data

(60) Provisional application No. 62/619,648, filed on Jan. 19, 2018.

(51) Int. Cl.
*H04W 72/12* (2009.01)
*H04L 5/00* (2006.01)
*H04W 72/14* (2009.01)

(52) U.S. Cl.
CPC ......... *H04W 72/1268* (2013.01); *H04L 5/001* (2013.01); *H04L 5/0042* (2013.01);
(Continued)

(58) Field of Classification Search
CPC ......... H04L 1/1861; H04L 5/00; H04L 5/001; H04L 5/0042; H04L 5/0055;
(Continued)

(56) References Cited

U.S. PATENT DOCUMENTS 9,107,191 B2 * 8/2015 Chen ................. H04W 72/0473
9,391,736 B2 7/2016 Nayeb Nazar et al.
(Continued)

FOREIGN PATENT DOCUMENTS

WO WO-2016039572 A2 3/2016

OTHER PUBLICATIONS

Ericsson: "On Mapping of UCI on PUSCH and Other Issues", 3GPP Draft; R1-1800949, On Mapping of UCI on PUSCH and Other Issues, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018 Jan. 13, 2018, XP051385182, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 14 pages.

(Continued)

*Primary Examiner* — Tri H Phan
(74) *Attorney, Agent, or Firm* — Holland & Hart LLP/Qualcomm

(57) ABSTRACT

Methods, systems, and devices for wireless communications are described that support splitting resources among different types of control information and uplink data for transmission on an uplink shared channel. A base station may transmit a grant indicating resource elements (REs) of an uplink shared channel allocated to a user equipment (UE) for an uplink transmission. The UE may process the grant and split the granted REs between different types of uplink control information (UCI) and uplink data based on a reference payload size. The UE may generate an uplink transmission based on the splitting of the REs, and may transmit the uplink transmission in the REs of the uplink shared channel indicated in the grant. The base station may monitor the REs of the uplink shared channel for the uplink
(Continued)

transmission in accordance with the splitting of the plurality of REs.

68 Claims, 18 Drawing Sheets

(52) U.S. Cl.
CPC .......... *H04L 5/0055* (2013.01); *H04L 5/0057* (2013.01); *H04L 5/0091* (2013.01); *H04L 5/0094* (2013.01); *H04W 72/14* (2013.01)

(58) Field of Classification Search
CPC ... H04L 5/0057; H04L 5/0091; H04L 5/0094; H04L 29/08477; H04L 67/108; H04L 1/0028; H04L 1/18; H04W 72/12; H04W 72/14; H04W 72/1268; H04W 72/1278; H04W 72/1284; H04W 72/1289; H04W 72/1294; H04W 74/00; H04W 72/04; H04W 72/0413; H04J 11/00
See application file for complete search history.

(56) References Cited

U.S. PATENT DOCUMENTS

| | | | | |
|---|---|---|---|---|
| 9,602,252 | B2* | 3/2017 | Takeda | H04L 1/1864 |
| 9,722,755 | B2 | 8/2017 | Jang et al. | |
| 9,775,141 | B2* | 9/2017 | Nimbalker | H04W 72/0413 |
| 9,999,041 | B2* | 6/2018 | Nimbalker | H04W 74/02 |
| 10,205,569 | B2* | 2/2019 | Kim | H04W 72/042 |
| 10,244,514 | B2* | 3/2019 | Yi | H04L 1/1854 |
| 10,530,528 | B2* | 1/2020 | Park | H04L 1/1861 |
| 10,680,774 | B2* | 6/2020 | Xiong | H04B 7/065 |
| 2017/0318575 | A1 | 11/2017 | Park et al. | |
| 2019/0165896 | A1* | 5/2019 | Huang | H04W 72/0413 |
| 2019/0173622 | A1 | 6/2019 | Xiong et al. | |

OTHER PUBLICATIONS

Ericsson: "On UCI on PUSCH", 3GPP Draft; R1-1721005, 3rd Generation Partnership Project (3GPP), Mobile Competence Centre, 650, Route Des Lucioles, F-06921 Sophia-Antipolis Cedex, France, vol. RAN WG1, No. Reno, Nevada, United States; Nov. 27, 2017-Dec. 1, 2017 Nov. 18, 2017, XP051370368, Retrieved from the Internet: URL:http://www.3gpp.org/ftp/tsg%5Fran/WG1%5FRL1/TSGR1%5F91/Docs/ [retrieved on Nov. 18, 2017], 7 pages.

International Search Report and Written Opinion—PCT/US2019/014301—ISA/EPO—dated Mar. 20, 2019.

"3rd Generation Partnership Project; Technical Specification Group Radio Access Network; NR; Multiplexing and Channel Coding (Release 15)," 3GPP Standard; Technical Specification; 3GPP TS 38.212, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 3, 2018, pp. 1-82, XP051392262, [retrieved on Jan. 3, 2018] section 7.3.1.2.1.

Ericsson: "UCI on sPUSCH with short TTI", 3GPP TSG-RAN WG1 Meeting #90, R1-1712900, Prague, Czech Republic, Aug. 21-25, 2017, pp. 1-8.

Intel Corporation: "UCI Embedding and PUSCH/PUCCH Multiplexing", 3GPP TSG RAN WG1 Meeting NR#3, R1-1716316, Nagoya, Japan, Sep. 18-21, 2017, pp. 1-7.

* cited by examiner

RESOURCE SPLITTING AMONG DIFFERENT TYPES OF CONTROL INFORMATION AND UPLINK DATA FOR A TRANSMISSION ON AN UPLINK SHARED CHANNEL

CROSS REFERENCES

The present application for patent claims the benefit of U.S. Provisional Patent Application No. 62/619,648 by HUANG, et al., entitled "RESOURCE SPLITTING AMONG DIFFERENT TYPES OF CONTROL INFORMATION AND UPLINK DATA FOR A TRANSMISSION ON AN UPLINK SHARED CHANNEL," filed Jan. 19, 2018, assigned to the assignee hereof, and expressly incorporated herein.

BACKGROUND

The following relates generally to wireless communication, and more specifically to resource splitting among different types of control information and uplink data for a transmission on an uplink shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform (DFT)-spread-orthogonal frequency division multiplexing (OFDM) (DFT-S-OFDM). A wireless multiple-access communications system may include a number of base stations or network access nodes, each simultaneously supporting communication for multiple communication devices, which may be otherwise known as user equipment (UE).

A UE may send uplink control information (UCI) to inform a serving base station about conditions of a wireless channel and other control information for managing communication over the wireless channel. UCI may include different types of information, such as hybrid automatic repeat request (HARQ) data, channel state information (CSI), or the like. In a typical scenario, the UE transmits UCI within transmission sent within a control channel (e.g., a physical uplink control channel (PUCCH)). In some cases, the UE may transmit UCI in a shared data channel (e.g., a physical uplink shared channel (PUSCH)). Transmitting control information, in an uplink shared channel may be referred to herein as piggybacking.

In conventional systems, a base station may send a grant allocating resources of a PUSCH to the UE for sending UCI piggybacked on a PUSCH transmission. Conventional techniques for allocating granted resources of the PUSCH among different types of UCI piggybacked on a PUSCH transmission are inefficient.

SUMMARY

The described techniques relate to improved methods, systems, devices, or apparatuses that support splitting resources among different types of control information and uplink data for an uplink transmission on an uplink shared channel. Generally, the described techniques split resource elements (REs) of an uplink transmission between different types of control information and uplink data. In some example, the splitting may relate to an improved distribution of allocated REs between different types of control information and uplink data, and reduce the probability of the entirety of the allocated REs being allocated to a single UCI type. In some examples, the splitting the REs may be in accordance with a reference payload size.

In an example, a base station may transmit a grant indicating a set of REs of an uplink shared channel allocated to a UE for an uplink transmission. The UE may use the allocation to send different types of UCI such as feedback data (e.g., hybrid automatic repeat request acknowledgement (HARQ-ACK), channel state information part 1 (CSI part 1) data, and CSI part 2 data, or the like, and uplink data, such as uplink shared channel (UL-SCH) data, in an uplink transmission sent within an uplink shared channel. The UE may process the grant and split the granted REs between the different types of UCI data and optionally the UL-SCH data. In an example, the REs may be split between HARQ-ACK data, CSI part 1 data, CSI part 2 data, and optionally UL-SCH data. As part of the splitting, the UE may calculate a number of the REs to allocate to the HARQ-ACK data, a number of the REs to allocate to the CSI part 1 data, a number of the REs to allocate to the CSI part 2 data, and optionally a number of the REs to allocate to the UL-SCH data, where each of the HARQ-ACK data, CSI part 1 data, CSI part 2 data, and optionally UL-SCH data is allocated distinct REs.

The calculation of how to split the REs may be based on weighting factors dynamically signaled by the base station for respectively weighting a payload size of the HARQ-ACK data, CSI part 1 data, CSI part 2 data, and optionally UL-SCH data. The weighting factors may be used to control the priority of the different types of UCI and optionally UL-SCH relative to one another. In some examples, a reference payload size may be an indication that the CSI part 2 data is to have a payload of a fixed size within the uplink transmission, and the reference payload size may reduce the likelihood that all of the REs are allocated to a particular one of the UCI types, such as HARQ-ACK data. The UE may then generate an uplink transmission based on the splitting, and may transmit the uplink transmission in the REs of the uplink shared channel indicated in the grant.

The base station may determine the splitting of the REs between HARQ-ACK data, CSI part 1 data, CSI part 2 data, and optionally UL-SCH, using the same calculation as applied by the UE. The base station may monitor the REs of the uplink shared channel indicated in the grant for the uplink transmission in accordance with the splitting of the plurality of REs. In some examples, a reference payload size may provide an improved distribution of allocated REs between different types of control information and optionally UL-SCH data, and reduce the probability of the entirety of the granted REs being allocated to a single UCI type.

A method of wireless communication is described. The method may include receiving, by a UE, a grant indicating a plurality of REs of an uplink shared channel allocated to the UE for an uplink transmission, splitting at least a portion of the plurality of REs between HARQ-ACK data, CSI part 1 data, and CSI part 2 data, generating the uplink transmission based at least in part on the splitting, and transmitting, by the UE, the uplink transmission in the plurality of REs of the uplink shared channel.

Another apparatus for wireless communication is described. The apparatus may include a processor, memory in electronic communication with the processor, and instructions stored in the memory. The instructions may be operable to cause the processor to receive, by a UE, a grant indicating a plurality of REs of an uplink shared channel allocated to the UE for an uplink transmission, split at least a portion of the plurality of REs between HARQ-ACK data, CSI part 1 data, and CSI part 2 data, generate the uplink transmission based at least in part on the splitting, and transmit, by the UE, the uplink transmission in the plurality of REs of the uplink shared channel.

An apparatus for wireless communication is described. The apparatus may include means for receiving, by a UE a grant indicating a plurality of REs of an uplink shared channel allocated to the UE for an uplink transmission, means for splitting at least a portion of the plurality of REs between HARQ-ACK data, CSI part 1 data, and CSI part 2 data, means for generating the uplink transmission based at least in part on the splitting, and means for transmitting, by the UE, the uplink transmission in the plurality of REs of the uplink shared channel.

A non-transitory computer-readable medium for wireless communication is described. The non-transitory computer-readable medium may include instructions operable to cause a processor to receive, by a UE, a grant indicating a plurality of REs of an uplink shared channel allocated to the UE for an uplink transmission, split at least a portion of the plurality of REs between HARQ-ACK data, CSI part 1 data, and CSI part 2 data, generate the uplink transmission based at least in part on the splitting, and transmit, by the UE, the uplink transmission in the plurality of REs of the uplink shared channel.

Some examples of the method, apparatus, and non-transitory computer-readable medium described above may further include processes, features, means, or instructions for receiving radio resource control (RRC) signaling indicating an allocation cap parameter. Some examples of the method, apparatus, and non-transitory computer-readable medium described above may further include processes, features, means, or instructions for setting a maximum number of the plurality of REs to allocate to the HARQ-ACK data based at least in part on the allocation cap parameter.

Some examples of the method, apparatus, and non-transitory computer-readable medium described above may further include processes, features, means, or instructions for calculating a number of the plurality of REs to allocate to the HARQ-ACK data may be based at least in part on the maximum number.

Some examples of the method, apparatus, and non-transitory computer-readable medium described above may further include processes, features, means, or instructions for receiving RRC signaling indicating an allocation cap parameter. Some examples of the method, apparatus, and non-transitory computer-readable medium described above may further include processes, features, means, or instructions for setting a maximum number of the plurality of REs to allocate to the CSI part 1 data based at least in part on the allocation cap parameter.

Some examples of the method, apparatus, and non-transitory computer-readable medium described above may further include processes, features, means, or instructions for calculating the number of the plurality of REs to allocate to the CSI part 1 data based at least in part on the maximum number.

Some examples of the method, apparatus, and non-transitory computer-readable medium described above may further include processes, features, means, or instructions for determining a total number of the plurality of REs that may be available for allocation based at least in part on a number of subcarriers associated with the grant and a number of symbol periods associated with the grant.

Some examples of the method, apparatus, and non-transitory computer-readable medium described above may further include processes, features, means, or instructions for setting the total number of the plurality of REs that may be available for allocation as a maximum number of the plurality of REs that may be available to allocate to the HARQ-ACK data.

In some examples of the method, apparatus, and non-transitory computer-readable medium described above, splitting of at least a portion of the plurality of REs comprises: allocating a number of the plurality of REs to the HARQ-ACK data. Some examples of the method, apparatus, and non-transitory computer-readable medium described above may further include processes, features, means, or instructions for identifying a remaining number of the plurality of REs that may be available for allocation based at least in part on determining that the number of the plurality of REs allocated to the HARQ-ACK data may be less than the total number of the plurality of REs that may be available for allocation. Some examples of the method, apparatus, and non-transitory computer-readable medium described above may further include processes, features, means, or instructions for splitting the remaining number of the plurality of REs between the CSI part 1 data and the CSI part 2 data.

In some examples of the method, apparatus, and non-transitory computer-readable medium described above, splitting of at least a portion of the plurality of REs comprises: calculating a number of the plurality of REs to allocate to the HARQ-ACK data in proportion to a weighted payload size of the HARQ-ACK data relative to a function of the weighted payload size of the HARQ-ACK data, a weighted payload size of the CSI part 1 data, and/or a weighted payload size of a reference payload size.

In some examples of the method, apparatus, and non-transitory computer-readable medium described above, splitting of at least a portion of the plurality of REs comprises: calculating a number of the plurality of REs to allocate to the CSI part 1 data in proportion to a weighted payload size of the CSI part 1 data relative to a function of a weighted payload size of the HARQ-ACK data, the weighted payload size of the CSI part 1 data, and/or a weighted payload size of a reference payload size.

In some examples of the method, apparatus, and non-transitory computer-readable medium described above, splitting of at least a portion of the plurality of REs comprises: receiving RRC signaling indicating a weighting factor for the HARQ-ACK data, a weighting factor for the CSI part 1 data, and a weighting factor for the CSI part 2 data. Some examples of the method, apparatus, and non-transitory computer-readable medium described above may further include processes, features, means, or instructions for determining a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

In some examples of the method, apparatus, and non-transitory computer-readable medium described above, splitting of at least a portion of the plurality of REs comprises: calculating a number of the plurality of REs to allocate to the CSI part 2 data based at least in part on a number of the plurality of REs allocated to the HARQ-ACK data and a number of the plurality of REs allocated to the CSI part 1 data.

In some examples of the method, apparatus, and non-transitory computer-readable medium described above, splitting of at least a portion of the plurality of REs includes calculating a number of the plurality of REs to allocate to the HARQ-ACK data in proportion to a weighted payload size of the HARQ-ACK data relative to a weighted payload size of a reference payload size.

In some examples of the method, apparatus, and non-transitory computer-readable medium described above, splitting of at least a portion of the plurality of REs includes calculating a number of the plurality of REs to allocate to the CSI part 1 data in proportion to a weighted payload size of the CSI part 1 data relative to a weighted payload size of a reference payload size.

Some examples of the method, apparatus, and non-transitory computer-readable medium described above may further include processes, features, means, or instructions for determining a reference payload size based at least on part on a value of a rank indication.

Some examples of the method, apparatus, and non-transitory computer-readable medium described above may further include processes, features, means, or instructions for processing the grant to determine that none of the plurality of REs may be allocated for transmission of uplink data and that each of the plurality of REs may be allocated for transmission of the HARQ-ACK data, or the CSI part 1 data, or the CSI part 2 data.

Some examples of the method, apparatus, and non-transitory computer-readable medium described above may further include processes, features, means, or instructions for processing the grant to determine that the uplink transmission may be to include non-access stratum data and not to include access stratum data.

In some examples of the method, apparatus, and non-transitory computer-readable medium described above, splitting of at least a portion of the plurality of REs further comprises: splitting the plurality of REs between the HARQ-ACK data, the CSI part 1 data, the CSI part 2 data, and uplink data. In some examples, the splitting may be based at least in part on a reference payload size of the CSI part 2 data.

A method of wireless communication is described. The method may include transmitting, by a base station, a grant indicating a plurality of REs of an uplink shared channel allocated to a UE for an uplink transmission, splitting at least a portion of the plurality of REs between HARQ-ACK data, CSI part 1 data, and CSI part 2 data, and monitoring the plurality of REs of the uplink shared channel for the uplink transmission based at least in part on the splitting.

An apparatus for wireless communication is described. The apparatus may include means for transmitting, by a base station, a grant indicating a plurality of REs of an uplink shared channel allocated to a UE for an uplink transmission, means for splitting at least a portion of the plurality of REs between HARQ-ACK data, CSI part 1 data, and CSI part 2 data, and means for monitoring the plurality of r REs of the uplink shared channel for the uplink transmission based at least in part on the splitting.

Another apparatus for wireless communication is described. The apparatus may include a processor, memory in electronic communication with the processor, and instructions stored in the memory. The instructions may be operable to cause the processor to transmit, by a base station, a grant indicating a plurality of REs of an uplink shared channel allocated to a UE for an uplink transmission, split at least a portion of the plurality of REs between HARQ-ACK data, CSI part 1 data, and CSI part 2 data, and monitor the plurality of REs of the uplink shared channel for the uplink transmission based at least in part on the splitting.

A non-transitory computer-readable medium for wireless communication is described. The non-transitory computer-readable medium may include instructions operable to cause a processor to transmit, by a base station, a grant indicating a plurality of REs of an uplink shared channel allocated to a UE for an uplink transmission, split at least a portion of the plurality of REs between HARQ-ACK data, CSI part 1 data, and CSI part 2 data, and monitor the plurality of REs of the uplink shared channel for the uplink transmission based at least in part on the splitting.

Some examples of the method, apparatus, and non-transitory computer-readable medium described above may further include processes, features, means, or instructions for transmitting RRC signaling indicating a first allocation cap parameter.

Some examples of the method, apparatus, and non-transitory computer-readable medium described above may further include setting a maximum number of the plurality of REs available to allocate to the HARQ-ACK data based at least in part on the first allocation cap parameter.

Some examples of the method, apparatus, and non-transitory computer-readable medium described above may further include calculating a number of the plurality of REs allocated to the HARQ-ACK data based at least in part on the maximum number of the plurality of REs available to allocate to the HARQ-ACK data.

In some examples of the method, apparatus, and non-transitory computer-readable medium described above, splitting of at least a portion of the plurality of REs may include: setting a maximum number of the plurality of REs available to allocate to the CSI part 1 data based at least in part on the first allocation cap parameter.

In some examples of the method, apparatus, and non-transitory computer-readable medium described above, splitting of at least a portion of the plurality of REs may include calculating a number of the plurality of REs allocated to the CSI part 1 data based at least in part on the maximum number of the plurality of REs available to allocate to the CSI part 1 data.

Some examples of the method, apparatus, and non-transitory computer-readable medium described above may further include processes, features, means, or instructions for determining a total number of the plurality of REs that may be available for allocation based at least in part on a number of subcarriers associated with the grant and a number of symbol periods associated with the grant.

In some examples of the method, apparatus, and non-transitory computer-readable medium described above, splitting of at least a portion of the plurality of REs includes: splitting the plurality of REs between the HARQ-ACK data, the CSI part 1 data, and the CSI part 2 data based at least in part on the total number of the plurality of REs that may be available for allocation.

In some examples of the method, apparatus, and non-transitory computer-readable medium described above, the total number of the plurality of REs that may be available for allocation excludes REs of the plurality of REs assigned to at least one reference signal.

In some examples of the method, apparatus, and non-transitory computer-readable medium described above, transmitting the grant further comprises: generating the grant to indicate that none of the total number of the plurality of REs may be allocated for transmission of uplink data and that each of total number of the plurality of REs may be allocated for transmission of the HARQ-ACK data, the CSI part 1 data, or the CSI part 2 data.

In some examples of the method, apparatus, and non-transitory computer-readable medium described above, transmitting the grant further comprises: generating the grant to indicate that the uplink transmission may be to include non-access stratum data and not to include access stratum data.

In some examples of the method, apparatus, and non-transitory computer-readable medium described above, splitting of at least a portion of the plurality of REs comprises: calculating a number of the plurality of REs allocated to the HARQ-ACK data in proportion to a weighted payload size of the HARQ-ACK data relative to a function of the weighted payload size of the HARQ-ACK data, a weighted payload size of the CSI part 1 data, and a weighted payload size of a reference payload size.

In some examples of the method, apparatus, and non-transitory computer-readable medium described above, splitting of at least a portion of the plurality of REs comprises: calculating a number of the plurality of REs allocated to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

In some examples of the method, apparatus, and non-transitory computer-readable medium described above, splitting of the plurality of REs comprises: transmitting RRC signaling indicating a weighting factor for the HARQ-ACK data, a weighting factor for the CSI part 1 data, and a weighting factor for the CSI part 2 data. Some examples of the method, apparatus, and non-transitory computer-readable medium described above may further include processes, features, means, or instructions for determining a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

In some examples of the method, apparatus, and non-transitory computer-readable medium described above, splitting of at least a portion of the plurality of REs comprises: calculating a number of the plurality of REs allocated to the CSI part 2 data based at least in part on a number of the plurality of REs allocated to the HARQ-ACK data and a number of the plurality of REs allocated to the CSI part 1 data.

Some examples of the method, apparatus, and non-transitory computer-readable medium described above may further include processes, features, means, or instructions for determining a reference payload size based at least on part on a value of a rank indication.

In some examples of the method, apparatus, and non-transitory computer-readable medium described above, splitting at least a portion of the plurality of REs further includes: splitting the plurality of REs between the HARQ-ACK data, the CSI part 1 data, the CSI part 2 data, and uplink data. In some examples, such splitting may be based at least in part on a reference payload size of the CSI part 2 data.

DETAILED DESCRIPTION

Figure 1:
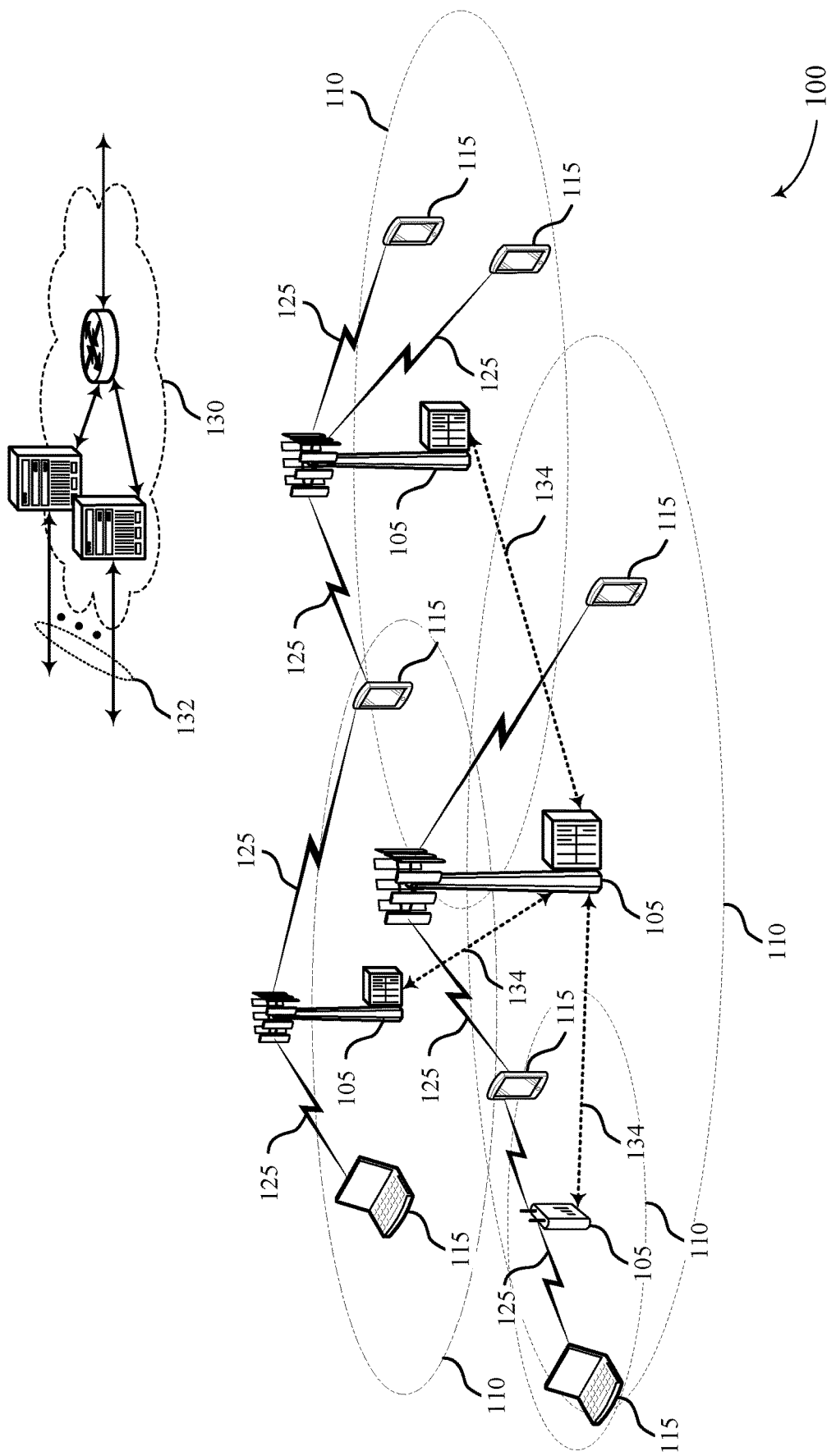
FIG. 1 illustrates an example of a system for wireless communication that supports resource splitting among different types of control information and uplink data for a transmission on an uplink shared channel in accordance with aspects of the present disclosure.

The described techniques relate to improved methods, systems, devices, or apparatuses that support splitting resources among different types of control information and optionally UL-SCH data for an uplink transmission on an uplink shared channel. Generally, the described techniques split REs of an uplink transmission between different types of control information and optionally UL-SCH data. In some examples, a calculation performed to split the granted REs among the different types of control information and optionally UL-SCH data may be a function of a reference payload size. Beneficially, the techniques described herein may result in an improved distribution of allocated REs between different types of control information and optionally UL-SCH, and reduce the probability of the entirety of the allocated REs being allocated to a single UCI type.

In an example, a base station may transmit downlink signaling that signals one or more parameters and a grant indicating an uplink resource allocation to a UE. The grant may allocate one or more resource blocks to the UE for an uplink transmission (e.g., a transmission in a PUSCH). Each resource block may correspond to a set of REs. The downlink signaling may further include an indication of a calculation method for splitting resources of an uplink resource allocation among a set of different UCI types and optionally UL-SCH data. The one or more parameters may include weighting factors for each UCI type and optionally UL-SCH data. The UE may receive the downlink signaling, identify the method for calculating the split, and process the weighting factors and the grant. In some examples, the UE may determine that it does not have any UL-SCH data from a medium access control (MAC) layer to send in the uplink transmission. In some examples, the grant may indicate that the UE is not to send any UL-SCH data within the one or more allocated resource blocks. In some examples, the grant may instruct the UE to send the HARQ-ACK and CSI data payloads in the one or more allocated resource blocks, with or without UL-SCH data.

In some examples, CSI may include different parts, and the UE may send the one or more CSI parts in a PUSCH transmission within the one or more allocated resource blocks. For example, CSI part 1 may include one or more of a rank indicator (RI), CSI reference signal index (CRI), a channel quality indicator (CQI) for a first continuous wave (CW), or the like, or any combination thereof. CSI part 2 may include Precoding Matrix Indicator (PMI), CQI for a second CW such as wideband and sub-band signaling, or the like, or any combination thereof. In some cases, the CQI part 2 may include wideband CQI, subband CQI, or both. Wideband CQI may be CQI corresponding to a bandwidth range in which frequency resources may be allocated to the UE for an uplink transmission. Subband CQI may correspond to a portion of the bandwidth range.

The UE may calculate a split of the number of REs of the one or more allocated resource blocks to respectively allocate to each of HARQ-ACK, CSI part 1, CSI part 2, and optionally UL-SCH. The calculations may be based on the received weighting factors for each UCI type and optionally UL-SCH, and a reference payload size for CSI part 2. In some cases, the split calculation may be based on a set of transfer equations that determine the number of REs to allocate to each UCI type and optionally UL-SCH. In some cases, the transfer equations may cap the number of REs that can be allocated to a particular type of UCI. In some examples, the weighting factors of the UCI types may be dynamically determined by the base station, and signaled (e.g., on a slot to slot basis) to the UE in, for example, downlink control information (DCI). In another examples, the base station may use Radio Resource Control (RRC) signaling to inform the UE.

Following determination of the split of the allocated REs among HARQ-ACK, CSI part 1, CSI part 2, and optionally UL-SCH, the UE may map the HARQ-ACK data, CSI part 1 data, CSI part 2 data, and optionally UL-SCH data in accordance with the determined split.

The UE may then generate and transmit an uplink transmission (e.g., a PUSCH transmission) within the REs of the uplink shared channel (e.g., PUSCH) indicated in the grant. For example, the UE may map the REs for HARQ-ACK, CSI part 1, CSI part 2, and optionally UL-SCH in accordance with a mapping pattern corresponding to the respective calculated numbers of v for each UCI type and optionally UL-SCH. The base station may configure the UE with a set of mapping patterns, the UE may locally store the mapping patterns, or both. The UE may then generate an uplink transmission in accordance with the split and transmit the uplink transmission within the REs allocated in the grant.

The base station may calculate the resource split of the uplink resource allocation, in the same manner as the UE determined the resource split. The base station may similarly determine the mapping pattern corresponding to the split, and which of the allocated REs are expected to respectively include HARQ-ACK data, CSI part 1 data, CSI part 2 data, and optionally UL-SCH data. The base station may then attempt to decode coded modulation symbols of the uplink shared channel corresponding to the allocation indicated in the grant and the calculated resource split. The base station may, for example, identify the coded modulation symbols of the uplink shared channel that are expected to include cyclic redundancy check (CRC) bits. The base station may determine that decoding is successful if data obtained from symbols of the shared data channel passes error detection (e.g., satisfies a cyclic redundancy check). The base station may provide positive acknowledgement (ACK) or a negative ACK (NACK) to the UE following successful or unsuccessful decoding of the REs allocated in the grant.

Aspects of the disclosure are initially described in the context of a wireless communications system. Aspects of the disclosure are further illustrated by and described with reference to apparatus diagrams, system diagrams, and flowcharts that relate to resource splitting among different types of control information and uplink data for a transmission on an uplink shared channel.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In some cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In some cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In some cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers. In some examples, the signaling may be RRC signaling.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 and a base station 105 may establish a connection for exchanging uplink and downlink transmissions. The UE 115 and the base station 105 provide acknowledgement feedback to let one another know whether a transmission passed error detection or if a prior transmission should be retransmitted. For uplink transmissions, the base station 105 may grant the UE 115 resources within an uplink shared channel (e.g., a PUSCH), and the UE 115 may piggyback UCI, such as ACK/NACK data, CSI data, or the like, on a transmission sent within the allocated PUSCH resources.

In an example, a UE 115 may receive and process downlink signaling from a serving base station 105 (e.g., DCI indication, RRC signaling) that indicates one or more parameters and includes a grant of resources within the uplink shared channel for an uplink transmission. The grant may indicate a set of REs in one or more resource blocks within the uplink shared channel are allocated to the UE 115 for an uplink transmission. The UE 115 may then determine how to distribute the allocated REs among a set of different types of control information and/or uplink data to be sent within the uplink transmission.

In some cases, the UE 115 may have UL-SCH data and signaling from the MAC layer to map on time and frequency resources of PUSCH. In some cases, the UE may also have UCI to transmit (e.g., piggyback) in the PUSCH transmission, as part of uplink communication to the base station. UCI is control signaling that may include any combination of (1) HARQ ACK/NACK information for one or more component carriers, (2) periodic CSI or aperiodic CSI feedback for one or more component carriers, (3) a scheduling request (SR), (4) a buffer status report (BSR), or the like.

UCI can be piggybacked on PUSCH resources that may or may not also transport UL-SCH data. For example, a UE may piggyback UCI on PUSCH with UL-SCH data (e.g., a MAC layer uplink shared channel). In another example, a UE may transmit UCI, such as aperiodic CSI (A-CSI) feedback, via a PUSCH transmission that does not include any UL-SCH data. In another example, a UE may transmit both HARQ-ACK data and A-CSI in a PUSCH transmission without any UL-SCH data.

Based on a grant of REs and one or more parameters received from the base station via control signaling (e.g., RRC signaling), the UE 115 may calculate the amount of REs to allocate to acknowledgement feedback data (e.g., HARQ-ACK data) and multi-part CSI indication (e.g., CSI part 1, CSI part 2). In an example, for a PUSCH transmission that includes HARQ-ACK data and does not include UL-SCH data, the number of REs to allocate for HARQ-ACK data (e.g., the number of coded modulation symbols per layer for HARQ-ACK data), denoted as $Q'_{ACK}$, may be determined by equation (1):

$$Q'_{ACK} = \min\left\{\left\lceil\frac{(O_{ACK}+L_{ACK})\cdot M_{sc}^{PUSCH}\cdot N_{symb}^{PUSCH}\cdot \beta_{offset}^{PUSH}}{O_{CSI\text{-}part1}+L_{CSI\text{-}part1}}\right\rceil, \sum_{l=0}^{N_{symb,all}^{PUSCH}-1} M_{sc}^{\Phi_{sc}^{UCI}}(l)\right\} \quad (1)$$

where $O_{ACK}$ may be the number of HARQ-ACK bits available for transmission and $L_{ACK}$ may be the number of CRC bits to be included in the PUSCH transmission. The UE 115 may apply a CRC algorithm to the HARQ-ACK bits being sent in the PUSCH transmission to generate the values for the CRC bits. $O_{CSI\text{-}part1}$ may represent the number of bits for CSI part 1 data available for transmission in the PUSCH transmission. $L_{CSI\text{-}part1}$ may be the number of CRC bits to be included with $O_{CSI\text{-}part1}$. The UE 115 may apply a CRC algorithm to the CSI part 1 bits being sent in the PUSCH transmission to generate the values for the CRC bits. $M_{sc}^{PUSCH}$ may be the scheduled bandwidth of the PUSCH transmission, expressed as a number of subcarriers. $N_{symb}^{PUSCH}$ may be the number of OFDM symbols of the PUSCH transmission, excluding all OFDM/single carrier frequency-division multiple access (SC-FDMA) symbols used for DMRS.

$\beta_{offset}^{PUSCH}$ may be a resource scaling factor (e.g., a linear scaling factor) having a value that is set based on downlink signalling (e.g., DCI, RRC signalling, etc.) received by the UE 115 from the base station 105. For example, $\beta_{offset}^{PUSCH}$ may be represented as, $\beta_{offset}^{PUSCH}=\beta_{offset}^{HARQ\text{-}ACK}/\beta_{offset}^{CSI\text{-}part1}$, where $\beta_{offset}^{HARQ\text{-}ACK}$ is a weighting proportionality for HARQ-ACK bits and $\beta_{offset}^{CSI\text{-}part1}$ is a weighting proportionality for bits of CSI part 1. $M_{sc}^{PT\text{-}RS}$ may be the number of subcarriers in an OFDM symbol that carries PTRS, in the PUSCH transmission. $N_{symb}^{PTRS}$ may be the number of OFDM symbols that carry PTRS, in the PUSCH transmission. $M_{sc}^{\Phi_l^{UCI}}(l)=|\Phi_l^{UCI}|$ may be the number of elements in a set $\Phi_l^{UCI}$, where $\Phi_l^{UCI}$ is the set of REs available for transmission of UCI in OFDM symbol period l, for l=0, 1, 2, ..., $N_{symb,all}^{PUSCH}-1$, and $N_{symb,all}^{PUSCH}$ is the total number of OFDM symbols of the PUSCH less the REs occupied by PTRS and therefore excluded in set $\Phi_l^{UCI}$. The REs occupied by PTRS may be determined based on $M_{sc}^{PT\text{-}RS}$ and $N_{symb}^{PTRS}$.

Based on equation (1), the UE 115 may determine the number of REs of the PUSCH transmission to allocate for HARQ-ACK data. The UE 115 may map the HARQ-ACK data (including the CRC bits) to REs of the PUSCH transmission based on the number of calculated REs. UE 115 may also determine the number of REs to allocate for transmission of CSI feedback. The UE 115 may map the one or more CSI data allocations (including the CRC bits) based on the number of calculated REs. The UE 115 may then generate a PUSCH transmission based on the mapping.

The base station 105 may monitor the allocated REs for the PUSCH transmission and attempt to decode the transmitted UCI data from the allocated REs. The base station 105 may use the CRC bits for determining whether each of the respective UCI data payloads are properly received. Both the UE 115 and the base station 105 may know the payload size for HARQ-ACK data, and REs allocated to the UE 115 for the uplink transmission. In particular, the base station 105 may know the payload size of HARQ-ACK based on the scheduled number of downlink packets. Additionally, both the UE 115 and the base station 105 may know the payload size of CSI part 1, given the CSI feedback type/mode configuration established at the base station.

A payload size for CSI part 2, however, may be rank dependent and therefore configured by the UE. In particular, the UE 115 may generate a rank indication (RI) for subsequent physical downlink shared channel (PDSCH) signaling, and provide the indication within CSI part 1. As a result, base station 105 may be unaware of the payload size for CSI part 2 until after decoding CSI part 1. Further, the payload size for CSI part 2 may be vary significantly and dynamically (e.g., 0 to 200 bits per component carrier) from uplink transmission to uplink transmission, thereby causing uncertainty at the base station 105 of how resources are split in the uplink transmission among the different UCI types.

Conventional techniques inefficiently split REs between HARQ-ACK and CSI data in an uplink transmission. That is, when UCI is piggybacked on PUSCH, conventional techniques for splitting the granted REs may result in a split where a single UCI type obtains a disproportionately large number of the granted REs, and the other UCI types obtain a small number (or none) of the granted REs. In particular, the quotient of equation (1) singularly includes CSI part 1 as a denominator value, and does not include a value for CSI part 2 data or HARQ-ACK data. As a result, the resource allotment for HARQ-ACK data may be disproportion in some circumstances. For example, consider if the payload sizes O for each of the HARQ-ACK data, the CSI part 1 data, and the CSI part 2 data are the same, and the weighting factors β are the same. Thus, $(O_{ACK}+L_{ACK})=(O_{CSI\text{-}part1}+L_{CSI\text{-}part1})=(O_{CSI\text{-}part2}+L_{CSI\text{-}part2})$ and $\beta_{offset}^{HARQ\text{-}ACK}=\beta_{offset}^{CSI\text{-}part1}$.

It would be expected that the allocated REs would be split at least somewhat evenly (e.g., a uniform allotment of REs) between the HARQ-ACK data, the CSI part 1 data, and the CSI part 2 data. However, inserting the payload sizes O for each of the HARQ-ACK data, the CSI part 1 data, and the CSI part 2 data are the same, and the weighting factors β into equation (1) leaves $M_{sc}^{PUSCH}\cdot N_{symb}^{PUSCH}$ on the left side of the minimum function, meaning that all of the PUSCH REs (e.g., $M_{sc}^{PUSCH}\cdot N_{symb}^{PUSCH}$) are allocated to HARQ-ACK data, and none are allocated to CSI part 1 data or CSI part 2 data. Thus, conventional techniques may disproportionally allocate REs to HARQ-ACK data.

To remedy at least this problem, the techniques described herein may efficiently split allocated REs of a PUSCH transmission to each of HARQ-ACK, CSI part 1, and CSI part 2, and optionally UL-SCH data. In some examples, the splitting may be based on a reference payload size for CSI part 2. The UE 115 and the base station 105 may calculate how to split REs allocated for an uplink reference signal, and in some examples may do so in accordance with a reference payload size. The value of the reference payload size may reduce the likelihood of a disproportionate amount of the available REs being allocated to one of the UCI types, at the expense of the other UCI types.

In some examples of the wireless communications system 100, various PUSCH resource piggyback deployment scenarios, including mapping of UCI onto REs corresponding to a PUSCH transmission may be supported. The UE 115 may map UCI and/or UL-SCH data to REs allocated by a grant for an uplink transmission. In some examples, UE 115 may piggyback UCI on the PUSCH transmission with or without UL-SCH data.

In an example, UE 115 may receive a grant from base station 105 as part of an uplink resource allocation. The grant may indicate one or more resource blocks and corresponding REs of an uplink shared channel being allocated to the UE 115 for an uplink transmission (e.g., a PUSCH transmission). In some cases, the UE 115 may receive one or more parameters via downlink signaling (e.g., via downlink control information (DCI)) from a serving base station 105 on at least a TTI to TTI basis (e.g., a slot to slot basis). The parameters may be weighting factors, allocation cap parameters, or the like.

In some cases, the UE 115 may receive and process RRC signaling from the base station 105 that may include the one or more parameters (e.g., one or more allocation cap parameters, one or more weighting factors, or the like). Based on the received DCI and/or RRC signaling, the UE 115 may calculate a number of resources for mapping UCI combinations (e.g., UCI) to the REs of the uplink resource allocation. Further, in some examples, each of the UE 115 and the base station 105 may split REs, for instance, in accordance with a reference payload size for CSI part 2. As a result, the UE 115 may determine a number of REs (e.g., the number of coded modulation symbols) to allocate to each of the different UCI types (e.g., HARQ-ACK, CSI part 1, CSI part 2) and optionally UL-SCH data in proportion to a payload size for each UCI type and a optionally a payload size of the UL-SCH data. The UE 115 may generate an uplink transmission based on the split, and transmit the uplink transmission within the REs of the uplink shared channel indicated in the grant. The base station 105 may apply a similar calculation of how to split the REs among the UCI types and optionally UL-SCH data, and monitor the REs of the uplink shared channel for an uplink transmission generated in accordance with the split.

Figure 2:
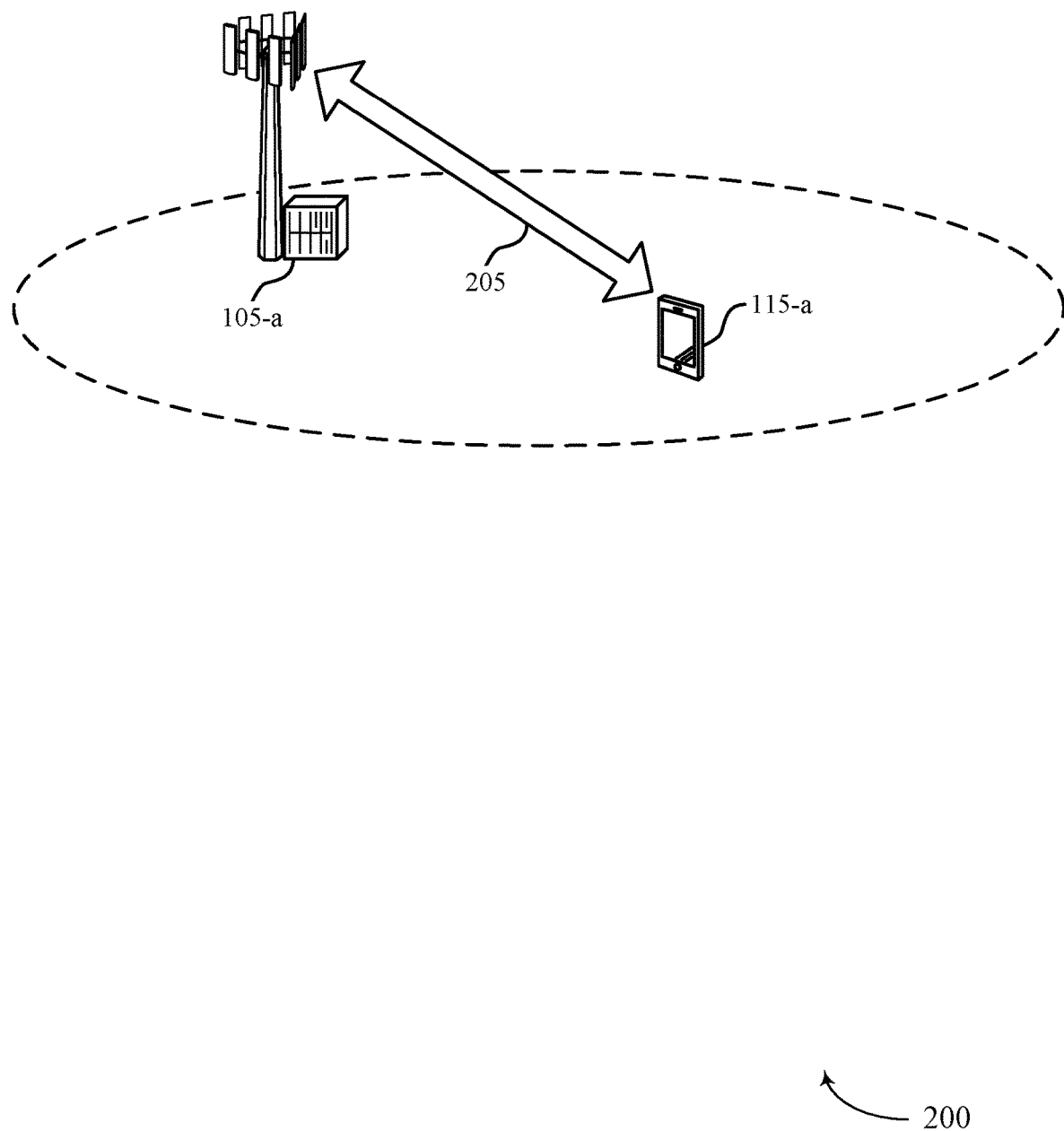
FIG. 2 illustrates an example of a wireless communications system that supports resource splitting among different types of control information and uplink data for a transmission on an uplink shared channel in accordance with aspects of the present disclosure.

FIG. 2 illustrates an example of a wireless communications system 200 that supports resource splitting among different types of control information and uplink data for a transmission on an uplink shared channel in accordance with various aspects of the present disclosure. In some examples, wireless communications system 200 may implement aspects of wireless communications system 100. For example, wireless communications system 200 includes UE 115-a and base station 105-a, which may be examples of the corresponding devices described with reference to FIG. 1. Wireless communications system 200 may support piggybacking CSI on a PUSCH transmission that may or might not include UL-SCH data.

UE 115-a may be synchronized with and camped on base station 105-a. In an example, UE 115-a may initiate establishment of an RRC connection with base station 105-a and may be configured to receive and transmit information 205 over licensed and unlicensed (shared) radio frequency spectrum band resources. Additional bearer contexts may be allocated to UE 115-a as part of PDN connectivity, to establish end-to-end connectivity between UE 115-a and the P-GW of the service network.

UE 115-a may receive downlink signaling from the base station 105-a, including a DCI indication and/or RRC signaling indication for one or more parameters and an uplink resource grant of resources within the uplink shared channel. In some cases, UE 115-a may process RRC signaling or DCI communicated by the base station 105-a to obtain a set of weighting factors that correspond to a respective UCI type, as part of resource scaling. In some examples, the downlink signaling may indicate which method to use for calculating how to split REs of an uplink resource allocation among a set of different UCI types and optionally UL-SCH data.

The grant may indicate time and frequency resources allocated for an uplink transmission that may span a set of OFDM symbols and a bandwidth that spans a set of subcarriers. In an example, the grant may identify a set of one or more resource blocks for an uplink transmission, and each of the resource blocks may include a set of REs. Each resource element may correspond to a single subcarrier (e.g., a tone) and a single OFDM symbol. In some cases, UE 115-a may process the grant to determine some or none of the REs for the PUSCH transmission are allocated for transporting UL-SCH data. UE 115-a may determine one or more UCI combinations (e.g., types), including a multi-part CSI data transmission, for resource allocation to REs of the grant. Further, in some examples, UE 115-a may determine a reference payload size for CSI part 2 data. The reference payload size may be a size of a payload of CSI part 2 data to be included in the uplink transmission, and used in equations described herein for calculating the number of REs to allocate to HARQ-ACK data, CSI part 1 data, and optionally UL-SCH data.

UE 115-a may evaluate the set of allocated REs of the uplink grant and determine a resource splitting among UCI types and optionally UL-SCH data within the uplink resource allocation. In particular, UE 115-a may determine a splitting of the REs of the uplink resource allocation among HARQ-ACK, CSI part 1, CSI part 2 data, and optionally UL-SCH data. The resource splitting may include calculating a number of REs to allocate to each of the UCI types and optionally to UL-SCH data. The calculation may be proportional to the received weighting factors and respective payload size for each UCI type and optionally UL-SCH data, including for example a reference payload size for CSI part 2 data. The determination may be a function of the bandwidth and total number of OFDM symbols allocated for the PUSCH transmission, excluding REs of the PUSCH transmission allocated to transport other types of information and/or data (e.g., demodulation reference signal, PTRS, etc.).

In some cases, UE 115-a may calculate the number of REs to allocate to each of HARQ-ACK, CSI part 1, CSI part 2, and optionally UL-SCH data based on a set of calculative functions. For example, the calculation for HARQ-ACK and CSI part 1 may be based on multiple-input single-output (MISO) transfer functions. The MISO functions may each calculate the relative minimum outputs of a pair of input functions. In some cases, the output may provide an indication for splitting the allocated REs for the PUSCH transmission between the UCI types and optionally UL-SCH data, in proportion to their respective payload sizes (e.g., number of bits) that include the number of appended CRC bits.

Splitting of the allocated REs may be linearly scaled by the received weighting factors of each UCI type (e.g., a resource offset factor) and optionally UL-SCH data. In some cases, the number of REs allocated to CSI part 1 and/or HARQ-ACK data may have a maximum value (e.g., capped) based on the total number of available resources, excluding REs of the PUSCH transmission assigned to one or more of DMRS, PTRS, additional UCI data, and the like. In some examples, the calculated allocation of REs for CSI part 2 may correspond to a calculated difference. For example, the calculated difference may correspond to a number of elements for CSI part 2 based on the total number of resources (e.g., all allocated REs indicated in the grant) excluding the calculated number of allocated REs for HARQ-ACK and CSI part 1 transmission.

In some examples, the UE 115-*a* may cap the amount of REs for allocation to each UCI type. In particular, a cap of the amount of REs that may be allocated for HARQ-ACK, CSI part 1, and in some cases, CSI part 2 may be introduced by one or more allocation cap parameters received by the UE 115-*a* from the base station 105-*a* via DCI and/or RRC signaling. For example, UE 115-*a* may determine the number of resources for each of HARQ-ACK and CSI part 1 according to individual multiple-input single-output (MISO) transfer functions. The functions may each calculate the relative minimum output of a pair of input functions. In some cases, the minimum outputs may each correspond to a number of REs for allocation to each of HARQ-ACK and CSI part 1, in proportion to their respective payload sizes relative to the assumed reference size for CSI part 2.

In some examples, the number of REs allocated to each of HARQ-ACK and CSI part 1 data may have a maximum value (e.g., capped) based on a proportion of the total number of available resources. The proportion may be calculated according to the one or more allocation cap parameters. In some examples, the calculated allocation of REs for CSI part 2 may correspond to either a calculated difference or proportionality weighting of the total number of resources. Specifically, the calculated difference may correspond to the amount of resources (e.g., REs) for CSI part 2 based on the total number of resources (e.g., all allocated REs indicated in the grant) excluding the calculated number of allocated REs for HARQ-ACK and CSI part 1 transmission. The proportionality weighting may correspond to a proportion of the total number of available resources. Similar to HARQ-ACK and CSI part 1, the proportion for CSI part 2 may be calculated according to the one or more additional parameterization values.

Following calculation of the number of REs to allocate for each type of UCI and optionally UL-SCH data, UE 115-*a* may map the REs for HARQ-ACK, CSI part 1, CSI part 2, and optionally UL-SCH data in accordance with a mapping pattern corresponding to the respective calculated numbers of REs for each UCI type and optionally UL-SCH data. In an example, the base station 105-*a* may configure the UE 115-*a* with a set of mapping patterns for different numbers of REs for HARQ-ACK, CSI parts 1 and 2, and optionally UL-SCH data. In another example, the UE 115-*a* may locally store the set of mapping patterns. A mapping pattern may specify in which REs of a PUSCH transmission to map HARQ-ACK indication, CSI part 1 data, CSI part 2 data, and optionally UL-SCH data, based on the resource splitting and in some examples a reference payload size for CSI part 2. The UE 115-*a* may also process the mapping pattern to determine where to map the other types of data and/or information to REs of the PUSCH transmission (e.g., DMRS, PTRS, UCI, CRC bits, or the like)). The UE 115-*a* may generate a PUSCH transmission based on the split and corresponding mapping pattern and transmit the PUSCH transmission within the REs of the uplink shared channel allocated in the grant.

Base station 105-*a* may calculate the resource splitting of the REs of the uplink resource allocation based on calculative functions for each UCI type and optionally UL-SCH data in the same manner as determined by UE 115-*a*. Base station 105-*a* may determine a mapping pattern corresponding to the respective calculated numbers of REs for each UCI type and optionally UL-SCH data, and monitor the shared channel for the PUSCH transmission from the UE 115-*a* corresponding to the calculated resource split. In an example, base station 105-*a* may attempt to decode the coded modulation symbols of the uplink shared channel corresponding to the REs allocated in the grant in accordance with the determined split. In particular, base station 105-*a* may determine a resource splitting proportionality between HARQ-ACK, CSI part 1, CSI part 2, and optionally UL-SCH data. In some examples, such a determination may be based on the reference payload size for CSI part 2. Base station 105-*a* may then know which of the REs of the uplink shared channel include HARQ-ACK data, which REs include CSI part 1 data, which REs include CSI part 2 data, and optionally which REs include UL-SCH data.

Base station 105-*a* may determine whether decoding of the REs allocated for the PUSCH transmission, in accordance with the known locations of the HARQ-ACK data, the CSI part 1 data, CSI part 2 data, and optionally UL-SCH data passes a CRC check. For example, a receiver of base station 105-*a* may process symbols of the allocated REs of the uplink shared channel in accordance with the known locations and identify locations of the CRC bits corresponding to respective payloads of the HARQ-ACK data, the CSI part 1 data, CSI part 2 data, and optionally UL-SCH data. If, in some cases, the observed (i.e., received) CRC bits match an expected CRC bit sequence for a particular payload (e.g., received CRC bits for HARQ-ACK data payload matches calculated CRC bits), base station 105-*a* may determine correct reception of the payload. If the CRC check corresponding to at least one of the payloads fails, the base station 105-*a* may identify a decoding error and request a retransmission of at least the one or more of the payloads that did not pass error detection.

The examples described herein may provide improved techniques for calculating resource splitting of an uplink resource allocation among UCI data types and optionally UL-SCH data, where the PUSCH transmission may or might not include UL-SCH data. UE 115-*a* may receive one or more parameters via DCI or via RRC signaling and a grant of a set of REs of an uplink shared channel for an uplink transmission, and subsequently calculate a split of the REs to allocate to HARQ-ACK, CSI part 1, CSI part 2 data, and optionally UL-SCH data. In some examples, such calculating a split may be based on a reference payload size for CSI part 2. In some examples, the number of REs of a PUSCH transmission available to allocate to the data payloads of the UCI combinations may exclude REs of the PUSCH transmission allocated for DMRS, PTRS signaling, or the like.

In an example, UE 115-*a* may splitting the REs of an uplink grant, among HARQ-ACK, CSI part 1, CSI part 2, and optionally UL-SCH data. Similarly, base station 105-*a* may split of the REs prior to decoding the uplink transmission. The calculative method for determining may be preconfigured or coordinated by UE 115-*a* and base station 105-*a*, based on a downlink signaling indication of base station 105-*a*.

Figure 3A:
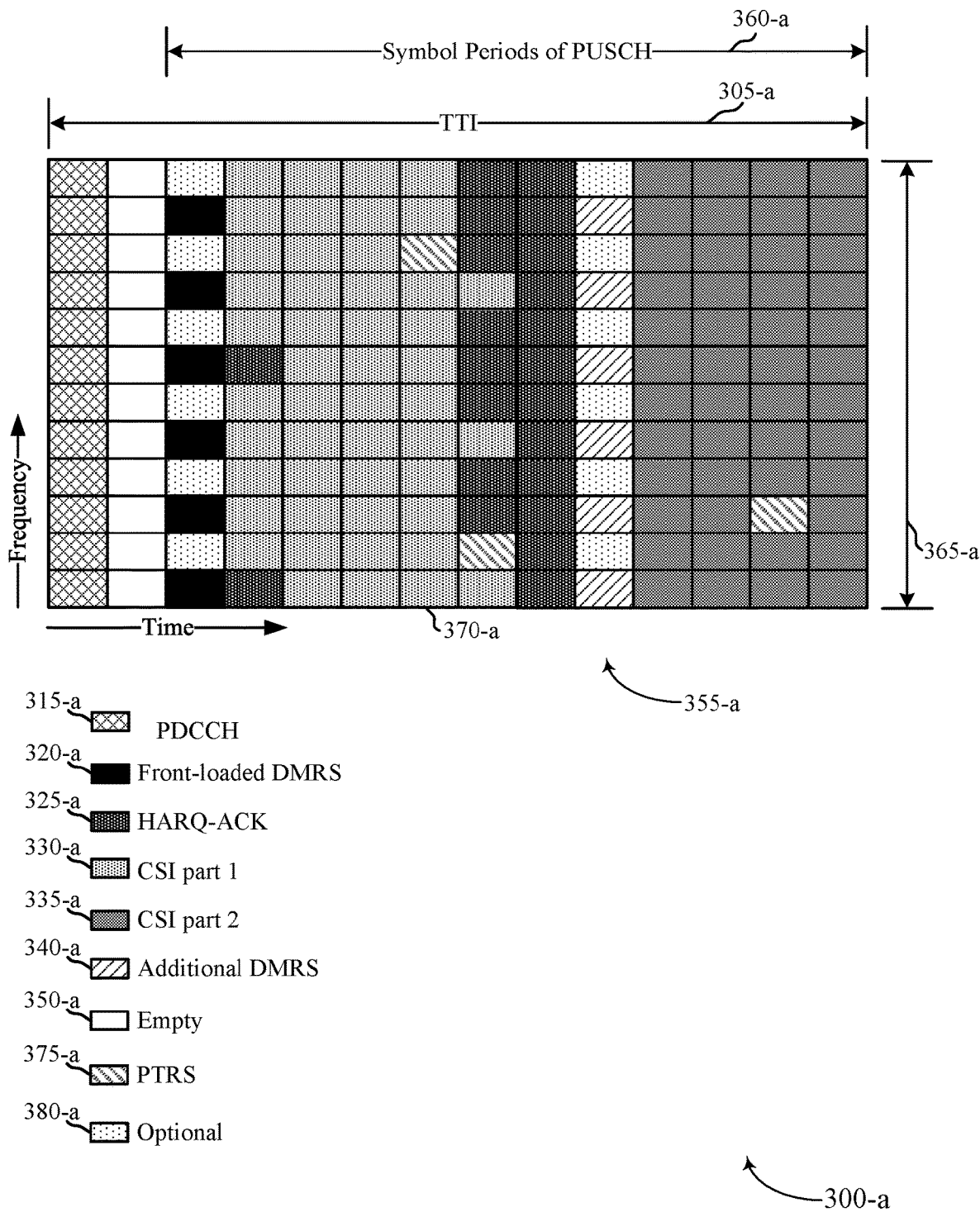
FIGS. 3A and 3B illustrate examples of example time and frequency resource diagrams that supports resource splitting among different types of control information and uplink data for a transmission on an uplink shared channel in accordance with aspects of the present disclosure.

In addition, a reference payload size for CSI part 2 may be jointly coordinated between UE 115-*a* and base station 105-*a* or pre-configured at each of the base station 105-*a* and the UE 115-*a*. FIG. 3A illustrates an example diagram 300-*a* of time and frequency resources that support resource splitting among different types of control information and uplink data for a transmission on an uplink shared channel in accordance with various aspects of the present disclosure. Depicted is a transmission time interval (TTI) 305-*a* that includes a PUSCH 355-*a* having a set of REs 370-*a* allocated to UE 115-*a* for an uplink transmission. TTI 305-*a* may correspond to a set of OFDM symbols and a set subcarriers that are a set of time and frequency resources that the base station 105-*a* may allocate to UE 115-*a* for an uplink transmission. Frequency is shown from top to bottom, and time is shown from left to right. The bandwidth of TTI 305-*a* may represent a portion of a system bandwidth that the base station 105-*a* may allocate to one or more UEs 115. TTI 305-*a* may repeat in time and the base station 105-*a* may allocate each TTI 305-*a* to the same UE or to different UEs. The time and frequency resources of TTI 305-*a* may correspond to a resource block that includes 12 subcarriers and 14 symbol periods. The time and frequency resources of TTI 305-*a* may include other numbers of subcarriers and/or symbol periods.

A first symbol period of TTI 305-*a* (e.g., leftmost column) may be a physical downlink control channel (PDCCH) 315-*a* and a second symbol period may be a guard period 350. The PDCCH 315-*a* may include downlink signaling, such as DCI, that transports a grant allocating resources of the PUSCH 355-*a* of the TTI 305-*a* to the UE 115-*a*. In some examples, downlink signaling may further include a calculation method indication for coordinated resource calculation at the base station 105-*a* and the one or more UEs 115. The downlink signaling may further include one or more parameters, including weighting factors for each of HARQ-ACK, CSI part 1, CSI part 2, and optionally UL-SCH data, for use in calculating the splitting of the REs of the uplink resource allocation. Guard period 350 may not transport any information and/or data to aid in obviating interference between downlink and uplink transmissions.

The PUSCH 355-*a* may be the set of REs corresponding to the set of symbol periods 360-*a* that includes the third through the fourteenth symbol period of the TTI 305-*a* and the set of subcarriers within the bandwidth 365-*a* of the PUSCH 355-*a*. In the depicted example, the PUSCH 355-*a* includes 144 REs 370, and may include other numbers of REs in other examples.

For each of HARQ-ACK and CSI part 1, the UE 115-*a* may calculate the number of REs of the PUSCH 355 to allocate to HARQ-ACK and CSI part 1 according to a pair of multiple-input single-output (MISO) transfer functions. The MISO functions may calculate the relatively smaller resultant value of a pair of input functions. The smaller resultant values may be the number of REs to allocate to HARQ-ACK and CSI part 1 data, respectively.

The first input of the transfer function may include a linearly scaled proportionality function expressed as a quotient between a weighted payload size of the UCI type and the weighted total UCI payload, including a weighted payload size for HARQ-ACK, CSI part 1, and in some examples the reference payload size for CSI part 2. For example, the transfer function for HARQ-ACK may include the product of the payload size and weighting factor for HARQ-ACK in the numerator and the sum-weighted product of the total UCI data payload in the denominator. Similarly, the transfer function for CSI part 1 may include the product of the payload size and weighting factor for CSI part 1 in the numerator and the sum-weighted product of the total UCI data payload in the denominator. The payload size of each UCI type may include CRC bits for the respective UCI type. The base station 105-*a* and the UE 115-*a* may share the same CRC algorithm that is used to generate the CRC bits for CSI part 1 data 330-*a* and for CSI part 2 data 335-*a*.

For HARQ-ACK, the second input of the transfer function may correspond to the output value of a summation function for a set representative of the number of REs available within the uplink resource allocation of PUSCH 355-*a*. The second input of the transfer function for CSI part 1 may correspond to a calculated difference between the output values of the summation function for a set representative of the number of REs available for transmission within PUSCH 355-*a*, and the total number of REs of PUSCH 355-*a* allocated to HARQ-ACK 325-*a*. The REs assigned to DMRS 320-*a* and 340-*a*, PTRS signaling 375-*a*, or additional UCI combinations may be subtracted from the set of available REs of the PUSCH 355-*a* that may be allocated to each of HARQ-ACK 325-*a* and CSI part 1 data 330-*a*.

For example, in some cases, the number of REs to allocate to HARQ-ACK, denoted as $Q'_{ACK}$, may be determined as follows by equation (2):

$$Q'_{ACK} = \min \left\{ \begin{bmatrix} \frac{(O_{ACK} + L_{ACK}) \cdot \beta_{offset}^{HARQ\text{-}ACK} \cdot M_{sc}^{PUSCH} \cdot N_{symb}^{PUSCH}}{(O_{ACK} + L_{ACK}) \cdot \beta_{offset}^{HARQ\text{-}ACK} +} \\ (O_{CSI\text{-}part1} + L_{CSI\text{-}part1}) \beta_{offset}^{CSI\text{-}part1} + \\ (O_{CSI\text{-}part2\text{-}reference} + L_{CSI\text{-}part2\text{-}reference}) \beta_{offset}^{CSI\text{-}part2} \end{bmatrix}, \\ \sum_{l=0}^{N_{symb,all}^{PUSCH}-1} M_{sc}^{\Phi^{UCI}}(l) \right\} \quad (2)$$

The number of REs to allocate to CSI part 1 data, denoted as $Q'_{CSI\text{-}part1}$, may be determined as follows by equation (3):

$$Q'_{CSI\text{-}part1} = \min \left\{ \begin{bmatrix} \frac{(O_{CSI\text{-}part1} + L_{CSI\text{-}part1}) \beta_{offset}^{CSI\text{-}part1} \cdot M_{sc}^{PUSCH} \cdot N_{symb}^{PUSCH}}{(O_{ACK} + L_{ACK}) \cdot \beta_{offset}^{HARQ\text{-}ACK} +} \\ (O_{CSI\text{-}part1} + L_{CSI\text{-}part1}) \beta_{offset}^{CSI\text{-}part1} + \\ (O_{CSI\text{-}part2\text{-}reference} + L_{CSI\text{-}part2\text{-}reference}) \beta_{offset}^{CSI\text{-}part2} \end{bmatrix}, \\ \sum_{l=0}^{N_{symb,all}^{PUSCH}-1} M_{sc}^{\Phi^{UCI}}(l) - Q'_{ACK} \right\} \quad (3)$$

For each of the respective functions, $O_{ACK}$ may be the number of bits for HARQ-ACK and $O_{CSI\text{-}part1}$ may be the number of bits for CSI part 1. $L_{ACK}$ may be the number of CRC bits for HARQ-ACK and $L_{CSI\text{-}part1}$ may be the number of CRC bits for CSI part 1. In the case that $O_{CSI,1}$ is less than or equal to a bit threshold (e.g., 11 bits) $L_{CSI\text{-}part1}$ may be set to the value 0. The CRC bits for HARQ-ACK may be appended to the information block corresponding to the HARQ-ACK data payload, and may be implemented for reception verification of downlink signalling received at UE 115-*a*. The CRC bits for CSI part 1 may be appended to the information block corresponding to the CSI part 1 data payload, and may be implemented for error management techniques of the uplink signalling.

$O_{CSI-part2-reference}$ may be the number of bits of a reference payload size of CSI part 2. In some cases, $O_{CSI-part2-reference}$ may be jointly coordinated with base station 105-*a* to provide the reference payload size for CSI part 2. In some cases, $O_{CSI-part2-reference}$ may be pre-configured at each of the base station 105-*a* and the UE 115-*a* based on an assumed RI value. For example, base station 105-*a* and UE 115-*a* may be preconfigured with or signal a rank value (e.g., RI) of 1 and determine a payload size for $O_{CSI-part2-reference}$ based on the rank value. Other RI values may be pre-configured or signalled by base station 105-*a* and UE 115-*a*, and coordinated for determining a payload size for CSI part 2. $L_{CSI-part2-reference}$ may be the number of CRC bits for CSI part 2. In the case that $O_{CSI-part2-reference}$ is less than or equal to a bit threshold (e.g., 11 bits) $L_{CSI-part2-reference}$ may be set to the value 0. The CRC bits for CSI part 2 may be appended to the information block corresponding to the CSI part 2 data payload, and may be implemented for feedback indication including wideband and sub-band CQI feedback.

$M_{sc}^{PUSCH}$ may be the scheduled bandwidth of the PUSCH transmission, expressed as a number of subcarriers; and $N_{symb}^{PUSCH}$ may be the number of OFDM symbols of the PUSCH transmission, excluding all OFDM/single carrier frequency-division multiple access (SC-FDMA) symbols used for DMRS. SC-FDMA may also be known as DFT-S-OFDM. The product of $M_{sc}^{PUSCH}$ and $N_{symb}^{PUSCH}$ may be representative of a total number of REs of the PUSCH allocated by the grant, less all REs allocated for DMRS.

$\beta_{offset}^{HARQ-ACK}$ may be the weighting factor for HARQ-ACK data transmission. $\beta_{offset}^{HARQ-ACK}$ may be represented in the numerator of the linearly scaled proportionality function expressed in equation (2). Similarly, $\beta_{offset}^{CSI-part1}$ may be the weighting factor for CSI part 1 and $\beta_{offset}^{CSI-part2}$ may be the weighting factor for CSI part 2. Each of the represented weighting factors may be associated with a resource scaling of the uplink resource allocation, for resource element splitting among the UCI types.

$M_{sc}^{PTRS}$ may be the number of subcarriers in an OFDM symbol that carries PTRS, in the PUSCH transmission; and $N_{symb}^{PTRS}$ may be the number of OFDM symbols that carry PTRS, in the PUSCH transmission, excluding all OFDM symbols used for DMRS. $M_{sc}^{\Phi^{UCI}}(l) = |\Phi_l^{UCI}|$ may be the number of elements in a set $\Phi_l^{UCI}$, where $\Phi_l^{UCI}$ is the set of REs available for transmission of UCI in OFDM symbol period l, for l=0,1, 2, ..., $N_{symb,all}^{PUSCH}-1$, and $N_{symb,all}^{PUSCH}$ is the total number of OFDM symbols of the PUSCH less the REs occupied by PTRS and therefore excluded in set $\Phi_l^{UCI}$. The REs occupied by PTRS may be determined based on $M_{sc}^{PTRS}$ and $N_{symb}^{PTRS}$.

The UE 115-*a* may use equations (2) and (3) to calculate how to split the number of REs among HARQ-ACK data and CSI part 1 data.

In an example, UE 115-*a* may use equation (2) to calculate a number of the granted REs to allocate to the HARQ-ACK data 325-*a* in proportion to a weighted payload size of the HARQ-ACK data (e.g., $(O_{ACK}+L_{ACK})*\beta_{offset}^{HACK-ACK}$) relative to a function of the weighted payload size of the HARQ-ACK data, a weighted payload size of the CSI part 1 data (e.g., $(O_{CSI-part1}+L_{CSI-part1})*\beta_{offset}^{CSI-part1}$), and a weighted payload size of a reference payload size (e.g., $(O_{CSI-part2-reference}+L_{CSI-part2-reference})*\beta_{offset}^{CSI-part2}$). In an example, UE 115-*a* may use equation (3) to calculate a number of the granted REs to allocate to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

The UE 115-*a* may then calculate the number of REs to allocate to CSI part 2, denoted as $Q'_{CSI-part2}$, based on a calculated difference. The calculated difference may correspond to a number of elements for CSI part 2 based on the total number of resources (e.g., all allocated REs indicated in the grant) excluding the calculated number of allocated REs for HARQ-ACK and CSI part 1 transmission, denoted as follows by equation (4):

$$Q'_{CSI-part2} = \left(\sum_{l=0}^{N_{symb,all}^{PUSCH}-1} M_{sc}^{\Phi^{UCI}}(l)\right) - Q'_{ACK} - Q'_{CSI-part1} \quad (4)$$

The calculated difference may correspond to any remaining REs of PUSCH 355-*a*. The remaining REs may exclude any REs allocated for transmission of other information and/or data, such as DMRS 320-*a* and 340-*a* and PTRS 375-*a*. If there are not any remaining REs, then the UE 115-*a* may not allocate any REs of PUSCH 355-*a* for transport of CSI part 2 data.

If, in some cases, the actual CSI part 2 data payload exceeds the capacity of the calculated number of allocated REs for CSI part 2, UE 115-*a* may drop excess bits of the CSI part 2 data payload to meet the allocated resource element capacity of the calculation. In particular, UE 115-*a* may drop the bits corresponding to sub-band CQI feedback, while including the bits for wideband CQI feedback within the allocated REs for CSI part 2.

UE 115-*a* may map the REs for the UCI combinations in accordance with a mapping pattern corresponding to the respective calculated numbers of REs for HARQ-ACK 325-*a*, CSI part 1 data 330-*a*, and CSI part 2 data 335-*a*. In an example, the base station 105-*a* may configure the UE 115-*a* with a set of mapping patterns for different numbers of REs for HARQ-ACK 325-*a*, CSI part 1 data 330-*a*, and CSI part 2 data 335-*a*. In another example, the UE 115-*a* may locally store the set of mapping patterns. A mapping pattern may specify in which REs of a PUSCH transmission to map the UCI combinations. An example mapping pattern corresponds to the shading of the PUSCH 355-*a* in FIG. 3A, where a first shading pattern indicates which REs 370-*a* are used to transport HARQ-ACK data 325-*a*, a second shading pattern indicates which REs 370-*a* are used to transport CSI part 1 data 330-*a*, and a third shading pattern REs 370-*a* are used to transport CSI part 2 data 335-*a*. As a result, the mapping may correspond to a resource splitting of the uplink resource allocation in proportion to the payload size for each UCI type. The mapping pattern may also indicate which REs of the PUSCH 355-*a* are allocated to transport DMRS 320-*a* and 340-*a*, and PTRS 375-*a*.

DMRS 320-*a* and 340-*a* may aid in channel estimation and coherent demodulation of the uplink shared channel. Each of DMRS 320-*a* and 340-*a* may be modulated according to the complex-valued Zadoff-Chu sequence and mapped directly onto the subcarriers of PUSCH using OFDM. In some cases, the UE 115-*a* may map DMRS 320-*a* or DMRS 340-*a* to all subcarrier frequencies in a particular symbol period. In some cases, the UE 115-*a* may map DMRS 320-*a* or DMRS 340-*a* to distinct REs in a particular symbol period, allowing resource frequency gaps 380-*a* where nothing is transmitted between REs that include symbols transporting DMRS. This may be referenced as a comb-like structure for DMRS signaling.

Additionally, PTRS 375-a may be transported within one or more REs of PUSCH 355-a. PTRS 375-a may be implemented in NR systems to enable compensation for oscillator phase noise associated with the carrier properties of the channel. Specifically, phase noise may increase as a function of oscillator carrier frequency. PTRS 375-a may therefore be utilized for high carrier frequencies (e.g., mmW) to mitigate phase noise and therefore potential degradations to signaling (e.g., common phase error (CPE)).

The UE 115-a may generate a PUSCH transmission that is a waveform generated based on the mapping pattern, and transmit the PUSCH transmission within the set of REs allocated to the UE 115-a in the grant. In some cases, the UE 115-a may be configured to generate a DFT-S-OFDM waveform, a CP-OFDM waveform, or the like.

Base station 105-a may monitor the shared channel for the PUSCH transmission from the UE 115-a. In an example, base station 105-a may calculate the resource splitting of the uplink resource allocation based on the calculative functions for each UCI type. In particular, base station 105-a may similarly calculate the number of allocated REs for HARQ-ACK 325-a according to equation (1), the number of allocated REs for CSI part 1 data 330-a according to equation (2), and the number of allocated REs for CSI part 2 data 335-a according to equation (3). In some cases, the calculations may be proportional to the weighting factors and respective payload size for each UCI type.

Base station 105-a may attempt to decode the coded modulation symbols of the uplink shared channel corresponding to the allocation indicated in the grant. Base station 105-a may also determine locations of CRC bits for the HARQ-ACK data, CSI part 1 data, and CSI part 2 data within the uplink shared channel. Base station 105-a may determine whether decoding of the REs allocated for the PUSCH transmission, in accordance with the determined split, passes a CRC check. If, in some cases, the observed (i.e., received) CRC bits match an expected CRC bit sequence for a particular payload (e.g., HARQ-ACK data payload), base station 105-a may determine correct reception of the HARQ-ACK data. If the CRC check corresponding to some or all of the payloads fails, the base station 105-a may identify a decoding error and request a retransmission of the payloads that did not pass error detection.

In another example, a UE 115-a may determine a number of REs of an uplink transmission to split among HARQ-ACK 325-a, CSI part 1 data 330-a, and CSI part 2 data 335-a that caps the number of REs that may be allocated to each of the different UCI types. The caps may be set based on allocation cap parameters coordinated by the UE 115-a and a base station 105-a. A reference payload size for CSI part 2 may be jointly coordinated between UE 115-a and base station 105-a or pre-configured at each of the base station 105-a and the UE 115-a. UE 115-a may cap the amount of REs for allocation to each UCI type according to one or more additional parameterization values of the received DCI and/or RRC signaling from base station 105-a. The additional parameterization values may correspond to at least proportionality constants α and γ respective to resource size calculations for HARQ-ACK and CSI part 1.

Figure 3B:
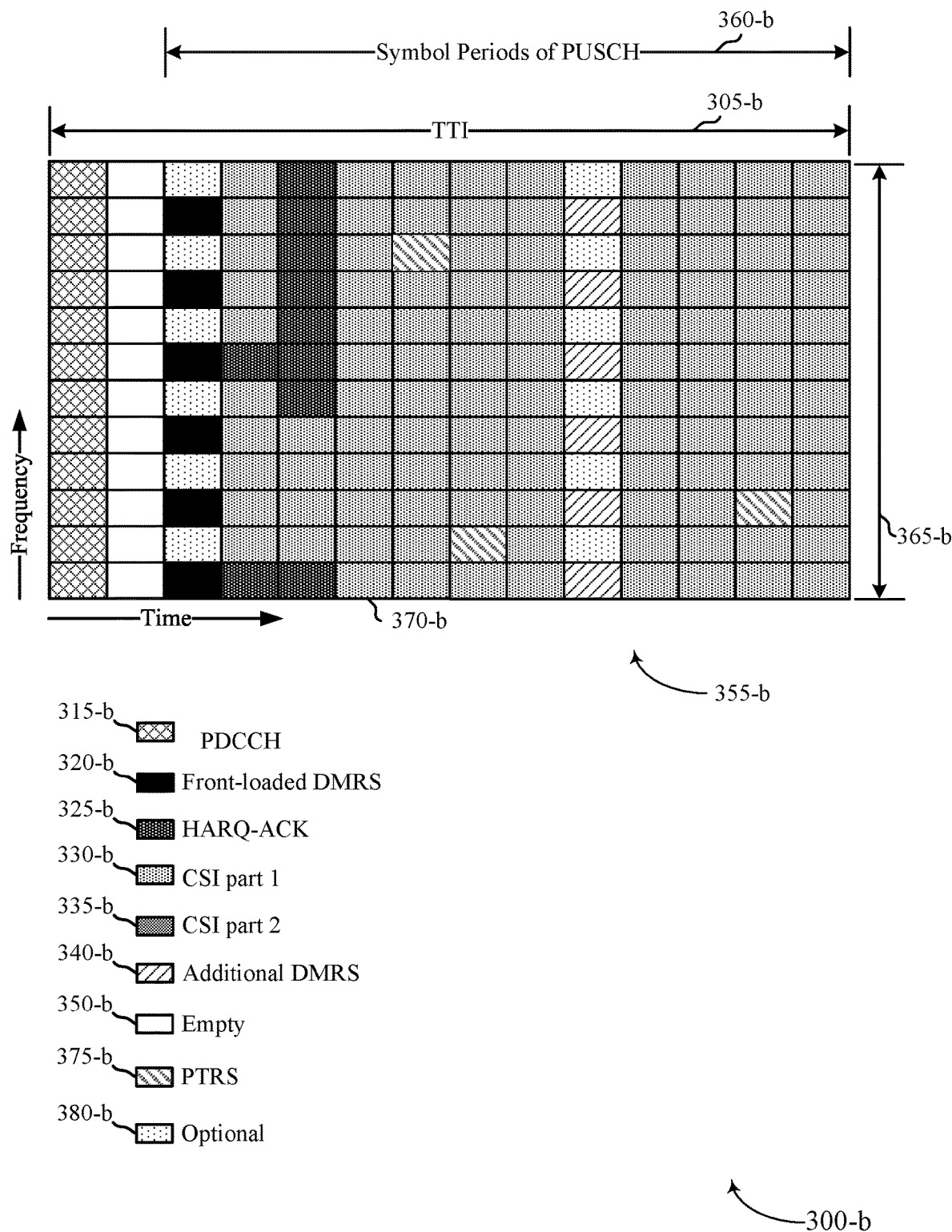

FIG. 3B illustrates an example diagram 300-b of time and frequency resources that support calculating channel state information resources for an uplink transmission on an uplink shared channel in accordance with one or more aspects of the present disclosure. TTI 305-b is an example of TTI 305-a. TTI 305-b may correspond to a set of OFDM symbols and may have a bandwidth 365-b corresponding to a set of subcarriers. Frequency is shown from top to bottom, and time is shown from left to right. A first symbol period of TTI 305-b may include a PDCCH 315-b and a second symbol period of TTI may include a guard period 350-b, and may be similar to the description above of PDCCH 315-a and guard period 350-a. PUSCH 355-b may be the set of REs corresponding to the set of symbol periods 360-b that includes the third through the fourteenth symbol period of the TTI 305-b and the set of subcarriers within the bandwidth 365-b of the PUSCH 355-b. In the depicted example, the PUSCH 355-b includes 144 REs 370-a, and may include other numbers of REs in other examples.

For each of HARQ-ACK and CSI part 1, the UE 115-a may calculate the number of REs of the PUSCH 355-b to allocate to HARQ-ACK and CSI part 1 according to a pair of multiple-input single-output (MISO) transfer functions. The MISO functions may calculate the relatively smaller resultant value of a pair of input functions. The smaller resultant values may be the number of REs to allocate to HARQ-ACK and CSI part 1 data, respectively.

The first input of the transfer function may include a linearly scaled proportionality function expressed as a quotient between a payload size of the UCI type and in some examples a reference payload size for CSI part 2. For example, the transfer function for HARQ-ACK may include the product of the payload size and weighting factor for HARQ-ACK in the numerator and the product of the reference payload size (in some examples) and weighting factor for CSI part 2 in the denominator. Similarly, the transfer function for CSI part 1 may include the product of the payload size and weighting factor for CSI part 1 in the numerator and the product of the reference payload size (in some examples) and weighting factor for CSI part 2 in the denominator. The payload size of each UCI type may include CRC bits for the respective UCI type.

The second input of the transfer function may correspond to a proportionality weighted value of the summation function for a set representative of the number of REs available within the uplink resource allocation of PUSCH 355-b. The REs assigned to DMRS 320-b and 340-b, PTRS signaling 360-b, or additional UCI combinations may be subtracted from the set of available REs of the PUSCH 355-b. Each of the second inputs of the transfer functions for HARQ-ACK and CSI part 1 may be capped by respective allocation cap parameters α and γ.

For example, in some cases, the number of resources to allocate to HARQ-ACK, denoted as $Q'_{ACK}$, may be determined as follows by equation (5):

$$Q'_{ACK} = \min\left\{\left\lceil \frac{(O_{ACK} + L_{ACK}) \cdot \beta_{offset}^{HARQ\text{-}ACK} \cdot M_{sc}^{PUSCH} \cdot N_{symb}^{PUSCH}}{(O_{CSI\text{-}part2\text{-}reference} + L_{CSI\text{-}part2\text{-}reference}) \beta_{offset}^{CSI\text{-}part2}} \right\rceil, \right. \tag{5}$$

$$\left. \alpha \sum_{l=0}^{N_{symb,all}^{PUSCH}-1} M_{sc}^{\Phi UCI}(l) \right\}$$

The number of REs to allocate to CSI part 1 data, denoted as $Q'_{CSI\text{-}part1}$, may be determined as follows by equation (6):

$$Q'_{CSI\text{-}part1} = \min\left\{\left\lceil\frac{(O_{CSI\text{-}part1} + L_{CSI\text{-}part1})\beta_{offset}^{CSI\text{-}part1} \cdot M_{sc}^{PUSCH} \cdot N_{symb}^{PUSCH}}{(O_{CSI\text{-}part2\text{-}reference} + L_{CSI\text{-}part2\text{-}reference})\beta_{offst}^{CSI\text{-}part2}}\right\rceil, \gamma \sum_{l=0}^{N_{symb,all}^{PUSCH}-1} M_{sc}^{\Phi^{UCI}}(l)\right\} \quad (6)$$

The included variable values in equations (5) and (6) may be the same as the defined values with reference to equations (1), (2), and (3). Further, the allocation cap parameters α and γ may be configured such that α<1, and γ<1.

The UE 115-a may use equations (5) and (6) to calculate the number of REs to allocate to HARQ-ACK data 325-b and CSI part 1 data 330-b. The UE 115-a may then calculate the number of REs to allocate to CSI part 2, denoted as $Q'_{CSI\text{-}part2}$, based on either a calculated difference or proportionality weighting of the set of available REs of the PUSCH 355-b. In the case of a calculated difference, the number of allocated resources for CSI part 2, denoted as $Q'_{CSI\text{-}part2}$, may be determined as follows by equation (7):

$$Q'_{CSI\text{-}part2} = \left(\sum_{l=0}^{N_{symb,all}^{PUSCH}-1} M_{sc}^{\Phi^{UCI}}(l)\right) - Q'_{ACK} - Q'_{CSI\text{-}part1} \quad (7)$$

In the case of a proportionality weighting, the number of allocated resources for CSI part 2, denoted as $Q'_{CSI\text{-}part2}$, may be determined as follows by equation (8):

$$Q'_{CSI\text{-}part1} = \lambda \sum_{l=0}^{N_{nymb,all}^{PUSCH}-1} M_{sc}^{\Phi^{UCI}}(l) \quad (8)$$

where λ is a distinct proportionality constant configured such that λ<1 and the sum of α, γ, and λ does not exceed 1.

As described with reference to equations (2) through (4), $M_{sc}^{\Phi^{UCI}}(l)=|\Phi_l^{UCI}|$ may be the number of elements in a set $\Phi_l^{UCI}$, where $\Phi_l^{UCI}$ is the set of REs available for transmission of UCI in OFDM symbol period l, for l=0, 1, 2, . . . , $N_{symb,all}^{PUSCH}-1$, and $N_{symb,all}^{PUSCH}$ is the total number of OFDM symbols of the PUSCH, less the REs occupied by PTRS and therefore excluded in set $\Phi_l^{UCI}$. $Q'_{ACK}$ and $Q'_{CSI\text{-}part1}$ may be the number of coded modulation symbols per layer for HARQ-ACK and CSI part 1 on PUSCH, as described herein with reference to equations (5) and (6).

Similar to the description provided above, the UE 115-a may then map, in accordance with a mapping pattern, HARQ-ACK data 325-b, CSI part 1 data 330-b, CSI part 2 data 335-b, and up to each of DMRS 320-b and 340-b, and PTRS 375-b to the REs of PUSCH 355-b for generation of a PUSCH transmission. In some cases, the UE 115-a may map DMRS 320-b or 340-b to distinct REs in a particular symbol period, allowing resource frequency gaps 380-b where nothing is transmitted between REs that include symbols transporting DMRS. This may be referenced as a comb-like structure for DMRS signaling.

The UE 115-a may transmit the PUSCH transmission within the set of REs of the uplink shared channel indicated in the grant. Base station 105-a may monitor the shared channel for the PUSCH transmission from the UE 115-a. In an example, base station 105-a may calculate the resource splitting of the REs of the uplink resource allocation based on calculative functions for each UCI type. In particular, base station 105-a may similarly calculate the number of allocated REs for HARQ-ACK 325-b according to equation (5), the number of allocated REs for CSI part 1 data 330-b according to equation (6), and the number of allocated REs for CSI part 2 data 335-b according to one of equations (7) or (8). Base station 105-a may then subsequently attempt to decode the coded modulation symbols of the uplink shared channel corresponding to the allocation indicated in the grant, similar to the descriptions provided above and herein.

Figure 4:
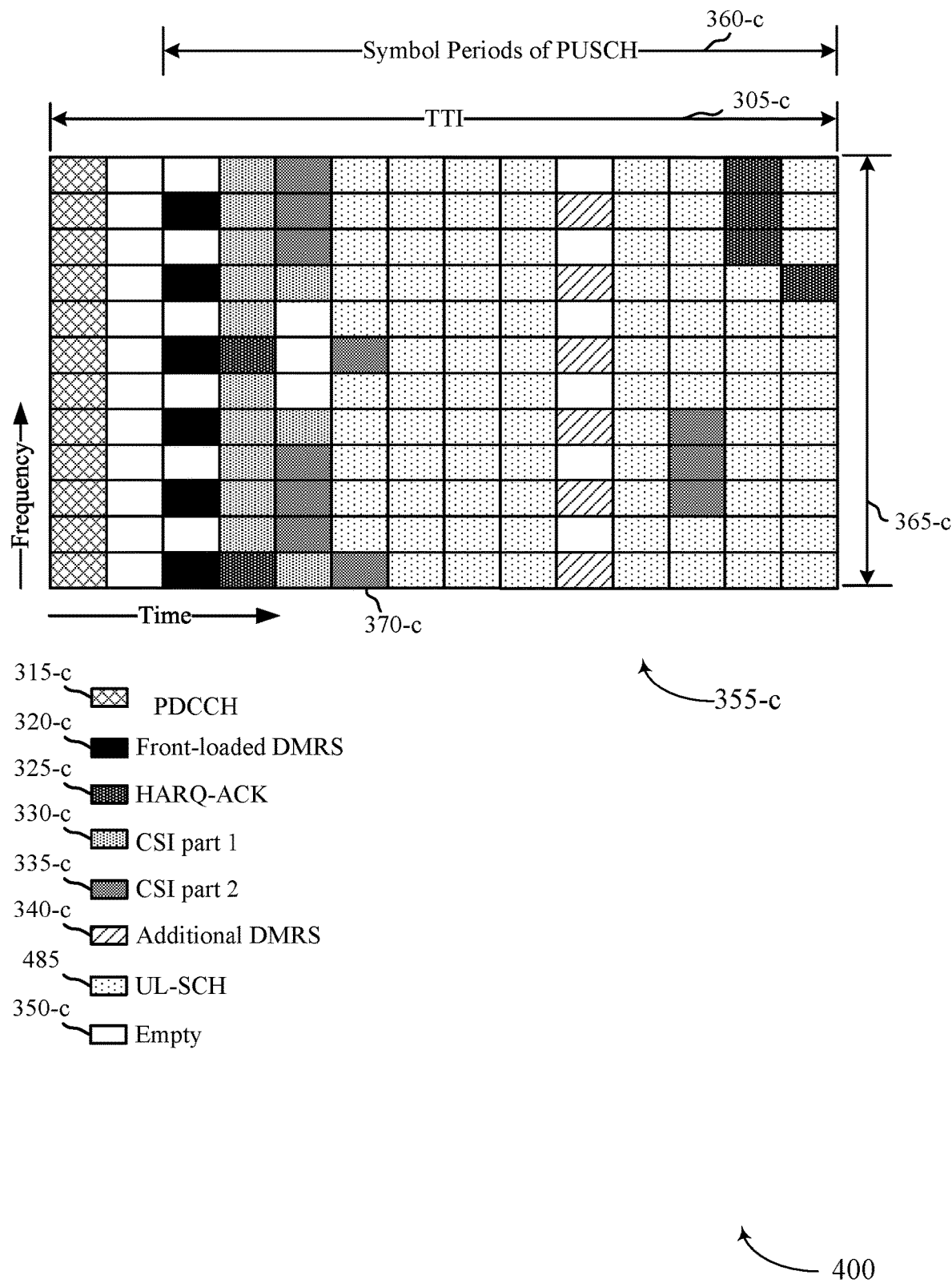
FIG. 4 illustrates an example of an example time and frequency resource diagram that supports resource splitting among different types of control information and uplink data for a transmission on an uplink shared channel in accordance with aspects of the present disclosure.

In some examples, the uplink transmission may also include UL-SCH data. FIG. 4 illustrates an example diagram 400 of time and frequency resources that support resource splitting among different types of control information and uplink data for a transmission on an uplink shared channel in accordance with various aspects of the present disclosure. TTI 305-c may correspond to a set of OFDM symbols and may have a bandwidth 365-c corresponding to a set of subcarriers. Frequency is shown from top to bottom, and time is shown from left to right. A first symbol period of TTI 305-c may include a PDCCH 315-c and a second symbol period of TTI may include a guard period 350-c. PUSCH 355-c may be the set of REs corresponding to the set of symbol periods 360-c that includes the third through the fourteenth symbol period of the TTI 305-c and the set of subcarriers within the bandwidth 365-c of the PUSCH 355-c. In the depicted example, the PUSCH 355-c includes 144 REs 370-c, and may include other numbers of REs in other examples.

The techniques described herein may provide for resource splitting among different UCI types and UL-SCH when piggybacking UCI on PUSCH that includes UL-SCH data 485. Similar to the discussion provided above, a reference payload size may be assumed for CSI-part 2 data. The UE 115-a may split the granted REs in proportion to a payload size for each of HARQ-ACK 325-c, CSI part 1 data 330-c, CSI part 2 data 335-c, and UL-SCH data 485 and multiplied by a respective weighting factor β. The base station 105-a and the UE 115-a may be pre-configured with and/or signal a reference size for CSI-part 2 for splitting the granted REs among HARQ-ACK 325-c, CSI part 1 data 330-c, CSI part 2 data 335-c, and UL-SCH data 485. Then the resource splitting among UCI types and UL-SCH data is proportional to payload sizes of UCI and UL-SCH multiplied by respective weighting factors β. As in some other examples, the payload size for CSI part 2 for the uplink transmission may be the reference payload size.

In an example, the number of REs (e.g., the number coded modulation symbols per layer) for HARQ-ACK denoted as $Q'_{ACK}$, CSI part 1 transmission denoted as $Q'_{CSI-part1}$, and CSI part 2 transmission denoted as $Q'_{CSI-part2}$, and for UL-SCH denoted as $Q'_{UL-SCH}$ are determined as follows:

$$Q'_{ACK} = \min \left\{ \begin{array}{l} \left\lceil \dfrac{(O_{ACK} + L_{ACK}) \cdot \beta_{offset}^{HARQ-ACK} \cdot M_{sc}^{PUSCH} \cdot N_{symb}^{PUSCH}}{\begin{array}{l}(O_{ACK} + L_{ACK}) \cdot \beta_{offset}^{HARQ-ACK} + \\ (O_{CSI-part1} + L_{CSI-part1}) \beta_{offset}^{CSI-part1} + \\ (O_{CSI-part2-reference} + L_{CSI-part2-reference}) \beta_{offset}^{CSI-part2} + \\ \left(\sum_{r=0}^{C_{UL-SCH}-1} K_r\right) \beta_{offset}^{UL-SCH}\end{array}} \right\rceil, \\ \sum_{l=0}^{N_{symb,all}^{PUSCH}-1} M_{sc}^{\Phi^{UCI}}(l) \end{array} \right\}$$

Equation (9)

$$Q'_{CSI-part1} = \min \left\{ \begin{array}{l} \left\lceil \dfrac{(O_{CSI-part1} + L_{CSI-part1}) \beta_{offset}^{CSI-part1} M_{sc}^{PUSCH} N_{symb}^{PUSCH}}{\begin{array}{l}(O_{ACK} + L_{ACK}) \beta_{offset}^{HARQ-ACK} + \\ (O_{CSI-part1} + L_{CSI-part1}) \beta_{offset}^{CSI-part1} + \\ (O_{CSI-part2-reference} + L_{CSI-part2-reference}) \beta_{offset}^{CSI-part2} + \\ \left(\sum_{r=0}^{C_{UL-SCH}-1} K_r\right) \beta_{offset}^{UL-SCH}\end{array}} \right\rceil, \\ \left(\sum_{l=0}^{N_{symb,all}^{PUSCH}-1} M_{sc}^{\Phi^{UCI}}(l)\right) - Q'_{ACK} \end{array} \right\}$$

Equation (10)

$$Q'_{CSI-part2} = \min \left\{ \begin{array}{l} \left\lceil \dfrac{(O_{CSI-part2} + L_{CSI-part2}) \beta_{offset}^{CSI-part2} M_{sc}^{PUSCH} N_{symb}^{PUSCH}}{\begin{array}{l}(O_{ACK} + L_{ACK}) \beta_{offset}^{HARQ-ACK} + \\ (O_{CSI-part1} + L_{CSI-part1}) \beta_{offset}^{CSI-part1} + \\ (O_{CSI-part2-reference} + L_{CSI-part2-reference}) \beta_{offset}^{CSI-part2} + \\ \left(\sum_{r=0}^{C_{UL-SCH}-1} K_r\right) \beta_{offset}^{UL-SCH}\end{array}} \right\rceil, \\ \left(\sum_{l=0}^{N_{symb,all}^{PUSCH}-1} M_{sc}^{\Phi^{UCI}}(l)\right) - Q'_{ACK} - Q'_{CSI-part1} \end{array} \right\}$$

Equation (11)

$$Q'_{UL-SCH} = \left(\sum_{l=0}^{N_{symb,all}^{PUSCH}-1} M_{sc}^{\Phi^{UCI}}(l)\right) - Q'_{ACK} - Q'_{CSI-part1} - Q'_{CSI-part2}$$

Equation (12)

The included variable values equations (9)-(12) may be the same as the defined values with reference to equations (1)-(8). Additionally, $C_{UL-SCH}$ is the number of code blocks for UL-SCH data 485 of the PUSCH transmission, $K_r$ is the r-th code block size for UL-SCH of the PUSCH transmission, and $\beta_{offset}^{UL-SCH}$ is the weighting factor for UL-SCH. In some examples, $\beta_{offset}^{UL-SCH}=1$ because the weighting factors for the different UCI types are defined with respect to UL-SCH.

The UE 115-$a$ and the base station 105-$a$ may use the equations (9)-(12) to determine how to split the granted REs among the different UCI types and UL-SCH data 485. The UE 115-$a$ may map and generate an uplink transmission in accordance with the split, similar to the description provided above. The base station 105-$a$ may also calculate the split using equations (9)-(12), and monitor the granted REs of the uplink shared channel for the uplink transmission based on the calculated splitting of the REs of the uplink shared channel indicated in the grant, similar to the description provided above.

The equations described herein may be modified to provide another example of how to perform resource splitting. For example, the respective numerators in equations (2)-(4) and (9)-(12) is a function of a total number of REs excluding the number of REs allocated to DMRS 320-$c$ and 340-$c$, and PTRS. These equations may be express where the total number of REs includes the number of REs allocated to DMRS and PTRS REs in the numerator, as described below.

In the above equations, $M_{sc}^{PUSCH}$ is the scheduled bandwidth of the PUSCH transmission, expressed as a number of subcarriers, and $N_{symb}^{PUSCH}$ is the number of OFDM symbols of the PUSCH transmission, excluding all OFDM symbols used for DMRS. $M_{sc}^{\Phi^{UCI}}(l)=|\Phi_l^{UCI}|$ is the number of elements in set $\Phi_l^{UCI}$, where $\Phi_l^{UCI}$ is the set of REs available for transmission of UCI in OFDM symbol l, for l=0, 1, 2, ..., $N_{symb,all}^{PUSCH}-1$, and $N_{symb,all}^{PUSCH}$ is the total number of OFDM symbols of the PUSCH. REs occupied by PTRS are excluded in set $\Phi_l^{UCI}$.

Considering the definition of the above three terms, it can be seen that $$\left(\sum_{l=0}^{N_{symb,all}^{PUSCH}-1} M_{sc}^{\Phi^{UCI}}(l)\right)$$

is the total number (i.e., denoted herein as X) of granted REs in the one or more resource blocks of the PUSCH allocated for the uplink transmission, and the X REs are split among HARQ-ACK, CSI part 1, optionally CSI part 2 (if CSI part 2 data is available), and optionally UL-SCH (if UL-SCH data is available). Another way to iterpret $$\left(\sum_{l=0}^{N_{symb,all}^{PUSCH}-1} M_{sc}^{\Phi^{UCI}}(l)\right)$$

is that $$\left(\sum_{l=0}^{N_{symb,all}^{PUSCH}-1} M_{sc}^{\Phi^{UCI}}(l)\right) = M_{sc}^{PUSCH} N_{symb}^{PUSCH} - Y,$$

where Y is the number of REs occupied by DMRS and PTRS, and $M_{sc}^{PUSCH} N_{symb}^{PUSCH}$ is the total number of REs including REs of DMRS and PTRS.

Based on the relation between $$\left(\sum_{l=0}^{N_{symb,all}^{PUSCH}-1} M_{sc}^{\Phi^{UCI}}(l)\right)$$

and $M_{sc}^{PUSCH}N_{symb}^{PUSCH}$, equations (2)-(4) and (9)-(12) presented in above sections, $M_{sc}^{PUSCH}N_{symb}^{PUSCH}$ may be replaced with $$\left(\sum_{l=0}^{N_{symb,all}^{PUSCH}-1} M_{sc}^{\Phi^{UCI}}(l)\right)$$

in the numerator of the first term within a minimum boundary (e.g., min{ }) operation in each equation. Also, the min{ } operation, and the second term within min{ } may be removed, as shown in the equations below.

The following presents an example of rewriting equations (2)-(4) where UCI is piggybacked on PUSCH without UL-SCH. In an example, the number of REs (e.g., coded modulation symbols per layer) for HARQ-ACK denoted as $Q'_{ACK}$, CSI part 1 transmission denoted as $Q'_{CSI\text{-}part1}$, and CSI part 2 transmission denoted as $Q'_{CSI\text{-}part2}$, are determined by respectively rewriting equations (2)-(4) as follows:

$$Q'_{ACK} = \frac{(O_{ACK}+L_{ACK})\cdot\beta_{offset}^{HARQ\text{-}ACK}\cdot\sum_{l=0}^{N_{symb,all}^{PUSCH}-1}M_{sc}^{\Phi^{UCI}}(l)}{(O_{ACK}+L_{ACK})\cdot\beta_{offset}^{HARQ\text{-}ACK}+(O_{CSI\text{-}part1}+L_{CSI\text{-}part1})\beta_{offset}^{CSI\text{-}part1}+(O_{CSI\text{-}part2\text{-}reference}+L_{CSI\text{-}part2\text{-}reference})\beta_{offset}^{CSI\text{-}part2}} \quad \text{Equation (13)}$$

$$Q'_{CSI\text{-}part1} = \frac{\beta_{offset}^{CSI\text{-}part1}\cdot M_{sc}^{PUSCH}\cdot M_{sc}^{\Phi^{UCI}}(l)\cdot(O_{CSI\text{-}part1}+L_{CSI\text{-}part1})}{(O_{ACK}+L_{ACK})\cdot\beta_{offset}^{HARQ\text{-}ACK}+(O_{CSI\text{-}part1}+L_{CSI\text{-}part1})\beta_{offset}^{CSI\text{-}part1}+(O_{CSI\text{-}part2\text{-}reference}+L_{CSI\text{-}part2\text{-}reference})\beta_{offset}^{CSI\text{-}part2}} \quad \text{Equation (14)}$$

$$Q'_{CSI\text{-}part2} = \left(\sum_{l=0}^{N_{symb,all}^{PUSCH}-1}M_{sc}^{\Phi^{UCI}}(l)\right)-Q'_{ACK}-Q'_{CSI\text{-}part1} \quad \text{Equation (15)}$$

The following presents an example of rewriting equations (9)-(12) where UCI is piggybacked on PUSCH with UL-SCH. In an example, the number of REs (e.g., number of coded modulation symbols per layer) for HARQ-ACK denoted as $Q'_{ACK}$, CSI part 1 transmission denoted as $Q'_{CSI\text{-}part1}$, and CSI part 2 transmission denoted as $Q'_{CSI\text{-}part2}$, and for UL-SCH denoted as $Q'_{UL\text{-}SCH}$ are determined by respectively rewriting equations (9)-(12) as follows:

$$Q'_{ACK} = \frac{(O_{ACK}+L_{ACK})\cdot\beta_{offset}^{HARQ\text{-}ACK}\cdot\sum_{l=0}^{N_{symb,all}^{PUSCH}-1}M_{sc}^{\Phi^{UCI}}(l)}{(O_{ACK}+L_{ACK})\cdot\beta_{offset}^{HARQ\text{-}ACK}+(O_{CSI\text{-}part1}+L_{CSI\text{-}part1})\beta_{offset}^{CSI\text{-}part1}+(O_{CSI\text{-}part2\text{-}reference}+L_{CSI\text{-}part2\text{-}reference})\beta_{offset}^{CSI\text{-}part2}+\left(\sum_{r=0}^{C_{UL\text{-}SCH}-1}K_r\right)\beta_{offset}^{UL\text{-}SCH}} \quad \text{Equation (16)}$$

$$Q'_{CSI\text{-}part1} = \frac{(O_{CSI\text{-}part1}+L_{CSI\text{-}part1})\beta_{offset}^{CSI\text{-}part1}\sum_{l=0}^{N_{symb,all}^{PUSCH}-1}M_{sc}^{\Phi^{UCI}}(l)}{(O_{ACK}+L_{ACK})\beta_{offset}^{HARQ\text{-}ACK}+(O_{CSI\text{-}part1}+L_{CSI\text{-}part1})\beta_{offset}^{CSI\text{-}part1}+(O_{CSI\text{-}part2\text{-}reference}+L_{CSI\text{-}part2\text{-}reference})\beta_{offset}^{CSI\text{-}part2}+\left(\sum_{r=0}^{C_{UL\text{-}SCH}-1}K_r\right)\beta_{offset}^{UL\text{-}SCH}} \quad \text{Equation (17)}$$

$$Q'_{CSI\text{-}part2} = \frac{(O_{CSI\text{-}part2}+L_{CSI\text{-}part2})\beta_{offset}^{CSI\text{-}part2}\sum_{l=0}^{N_{symb,all}^{PUSCH}-1}M_{sc}^{\Phi^{UCI}}(l)}{(O_{ACK}+L_{ACK})\beta_{offset}^{HARQ\text{-}ACK}+(O_{CSI\text{-}part1}+L_{CSI\text{-}part1})\beta_{offset}^{CSI\text{-}part1}+(O_{CSI\text{-}part2\text{-}reference}+L_{CSI\text{-}part2\text{-}reference})\beta_{offset}^{CSI\text{-}part2}+\left(\sum_{r=0}^{C_{UL\text{-}SCH}-1}K_r\right)\beta_{offset}^{UL\text{-}SCH}} \quad \text{Equation (18)}$$

$$Q'_{UL\text{-}SCH} = \left(\sum_{l=0}^{N_{symb,all}^{PUSCH}-1}M_{sc}^{\Phi^{UCI}}(l)\right)-Q'_{ACK}-Q'_{CSI\text{-}part1}-Q'_{CSI\text{-}part2} \quad \text{Equation (19)}$$

Thus, the total number of REs in the numerators in equations (2)-(4) and (9)-(12) exclude the number of REs allocated to DMRS 320-c and 340-c, and PTRS REs, and may be rewritten as shown in equations (13)-(19) where the total number of REs includes the number of REs allocated to DMRS 320-c and 340-c, and PTRS REs in the numerator.

Figure 5:
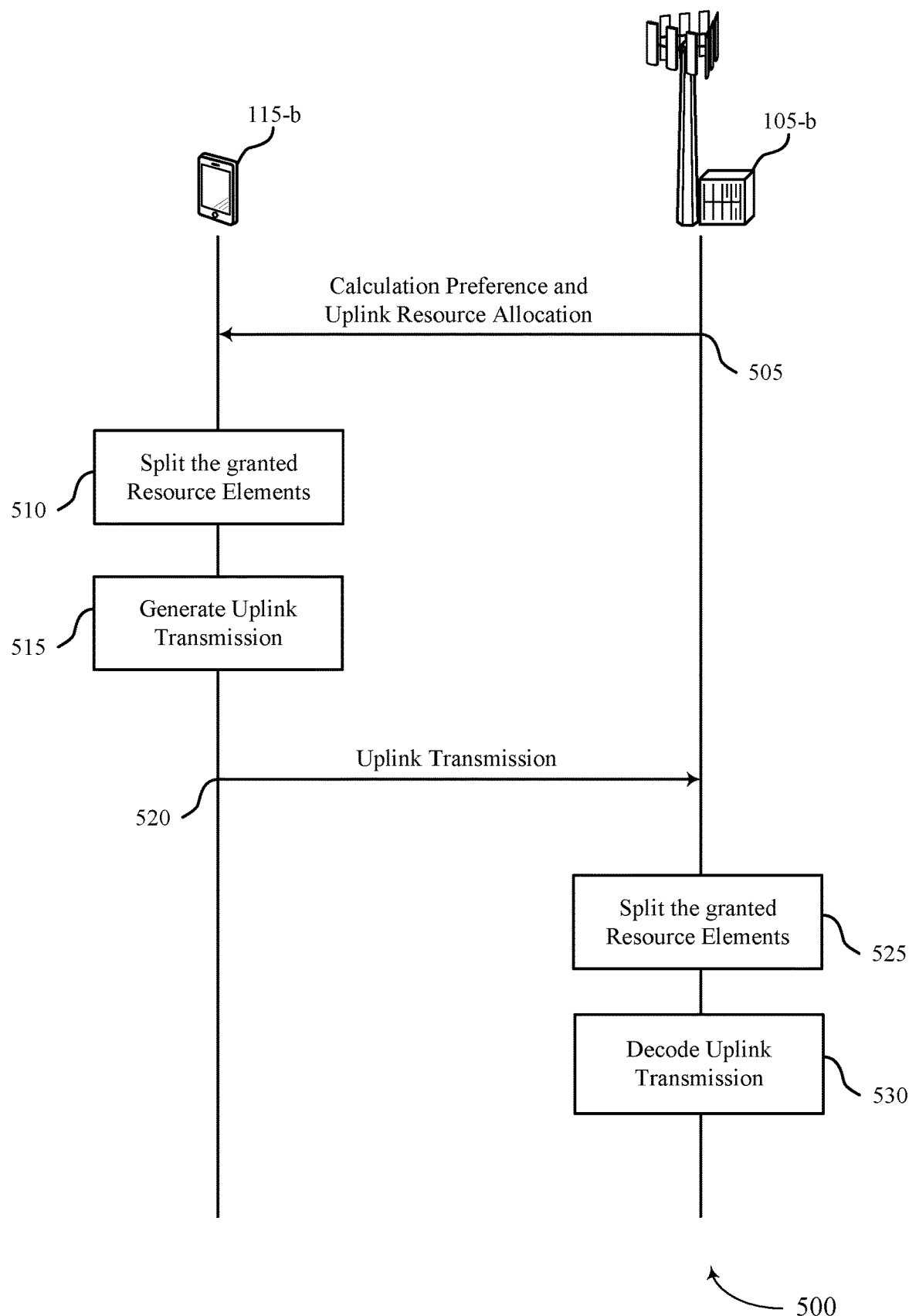
FIG. 5 illustrates an example of a process flow that supports resource splitting among different types of control information and uplink data for a transmission on an uplink shared channel in accordance with aspects of the present disclosure.

FIG. 5 illustrates an example of a process flow 500 in a system that supports resource splitting among different types of control information and uplink data for a transmission on an uplink shared channel in accordance with various aspects of the present disclosure. In some examples, process flow 500 may implement aspects of wireless communication system 100. For example, process flow 500 includes UE 115-b and base station 105-b, which may be examples of the corresponding devices described with reference to FIGS. 1 through 4.

Base station 105-b may transmit downlink signaling (e.g., DCI, RRC signaling) indication 505 for one or more parameters and an uplink resource grant of resources within the uplink shared channel. The downlink signaling may include an indication of a calculation method for resource splitting of an uplink resource allocation. In particular, the signaling may indicate a calculative method preference for calculating the number of resources for allocation to HARQ-ACK, CSI part 1, and CSI part 2 based on the set of equations (2)-(4), or the set of equations (5), (6), and one of (7) or (8), or the set of equations (9)-(12), or the set of equations (13)-(15), or the set of equations (16)-(19), with reference to FIGS. 3A-B and 4. In other examples, the calculation method may be preconfigured.

Each of the respective calculative methods, in some examples, may be based on an preconfigured or signaled reference payload size for CSI part 2. Transmission 505 may include a grant indicating a resource allocation for an uplink transmission in an uplink shared channel. The resource allocation may correspond to a set of time and frequency resources for the UE 115-*b* to send a PUSCH transmission. The grant may indicate a set of REs corresponding to tones (subcarriers) and OFDM symbol periods within an uplink shared channel. In some cases, the base station 105-*b* may send the grant indication in a different transmission.

The transmission 505 may also include a set of weighting factors corresponding to each UCI type and optionally UL-SCH data as part of a resource scaling. In some cases, base station 105-*b* may send the resource scaling factor in a different transmission. Each of the weighting factors ft may correspond to a proportionality indication, including a weighting for HARQ-ACK, CSI part 1, CSI part 2, and optionally UL-SCH. Base station 105-*b* may determine how to distribute resources among each type of UCI and optionally UL-SCH, and set a resource scaling of the weighting factors accordingly.

UE 115-*b* may receive and process transmission 505 to obtain the resource grant and optionally to determine a calculative method for resource splitting of the uplink resource allocation for UCI data payloads. In some examples, UE 115-*b* may determine that transmission 505 does not allocate any REs of the PUSCH transmission to transport UL-SCH data. In some cases, UE 115-*a* may process the grant and determine that the UE 115-*a* is instructed to only include non-access stratum data, and no access stratum data, within the uplink transmission.

At 510, UE 115-*b* may calculate how to split the number of allocated REs of PUSCH to allocate to each of HARQ-ACK, CSI part 1, CSI part 2 and optionally UL-SCH data based on the indicated set of equations provided herein. The calculations may be based on the received weighting factors for each UCI type and optionally for UL-SCH data, and identifying features of the CSI transmission. In some examples, such identifying features may include a reference payload size for CSI part 2. In some cases, the calculations may be based on a set of transfer equations that determine the number of REs for allocation to each UCI type based on the respective payload size relative to the total UCI data payload. In some cases, the calculations may include capping the amount of resources for each UCI type. In some cases, the calculations may specify an amount of the resource element to allocate to UL-SCH data.

Following calculation of a number of resources to allocate to HARQ-ACK, CSI part 1, CSI part 2, and optionally UL-SCH data, UE 115-*b* may generate shared channel transmission at 515. The generation may include mapping of each UCI data payload and optionally the UL-SCH data payload to the resources of PUSCH allocated by the grant, in association with additional coded modulation signaling (e.g., DMRS, PTRS, etc.). UE 115-*b* may then transmit the uplink transmission 520 to base station 105-*b* on the uplink shared channel.

At 525, base station 105-*a* may monitor the shared channel for the PUSCH transmission from the UE 115-*a* and calculate the resource splitting of the uplink resource allocation based on the set of functions for the indicated calculative method preference. In particular, base station 105-*a* may similarly calculate the number of allocated REs for HARQ-ACK, CSI part 1, and CSI part 2 based on the set of equations (2)-(4), or the set of equations (5), (6), and one of (7) or (8), or the set of equations (9)-(12), or the set of equations (13)-(15), or the set of equations (16)-(19), with reference to FIGS. 3A-B and 4. with reference to FIGS. 3A-B and 4. The calculations may be proportional to the weighting factors and respective payload size for each UCI type and optionally UL-SCH, including in some examples a reference payload size for CSI part 2. In some cases, base station 105-*a* may perform the monitoring at 525 at other times including distinctly prior to, or subsequently following the reception of uplink transmission 520, or as part of grant generation prior to downlink signaling 505.

At 530, base station 105-*b* may attempt to decode the coded modulation symbols of the uplink shared channel. In an example, base station 105-*b* may attempt to decode the coded modulation symbols of the uplink shared channel corresponding to the allocation indicated in the grant. Because of the different mapping patterns, the REs transporting the UCI data payloads and optionally UL-SCH data may be in different locations within the shared data channel. The base station 105-*b* may identify the mapping pattern corresponding to the calculated resource split.

The base station 105-*b* may use the calculated resource split for determining the expected locations of REs of the uplink transmission that include the CRC bits for each of HARQ-ACK, CSI part 1, CSI part 2, and optionally UL-SCH. The base station 105-*b* may perform a CRC check using the CRC bits each UCI type data payload and optionally UL-SCH payload, and determine if the obtained CSI data for HARQ-ACK, CSI part 1, CSI part 2 and optionally UL-SCH passes a respective CRC check. If the obtained HARQ-ACK data, CSI part 1 data, the CSI part 2 data, and optionally UL-SCH data each passes CRC, the base station 105-*b* may send an acknowledgment to the UE 115-*b* indicating that the UCI data and optionally UL-SCH passed CRC. If one or more of the obtained HARQ-ACK data, CSI part 1 data, the CSI part 2 data, and optionally UL-SCH data did not pass CRC, the base station 105-*b* may send a negative acknowledgment to the UE 115-*b* indicating that which the UCI data payloads and optionally UL-SCH data did not pass CRC. The UE 115-*b* may retransmit the HARQ-ACK, CSI part 1, CSI part 2 data and optionally UL-SCH data in a subsequent uplink transmission.

In some examples, the techniques described herein may utilize a reference payload size to provide an improved distribution of allocated REs between different types of control information, and reduce the probability of the entirety of the allocated REs being allocated to a single UCI type.

Figure 6:
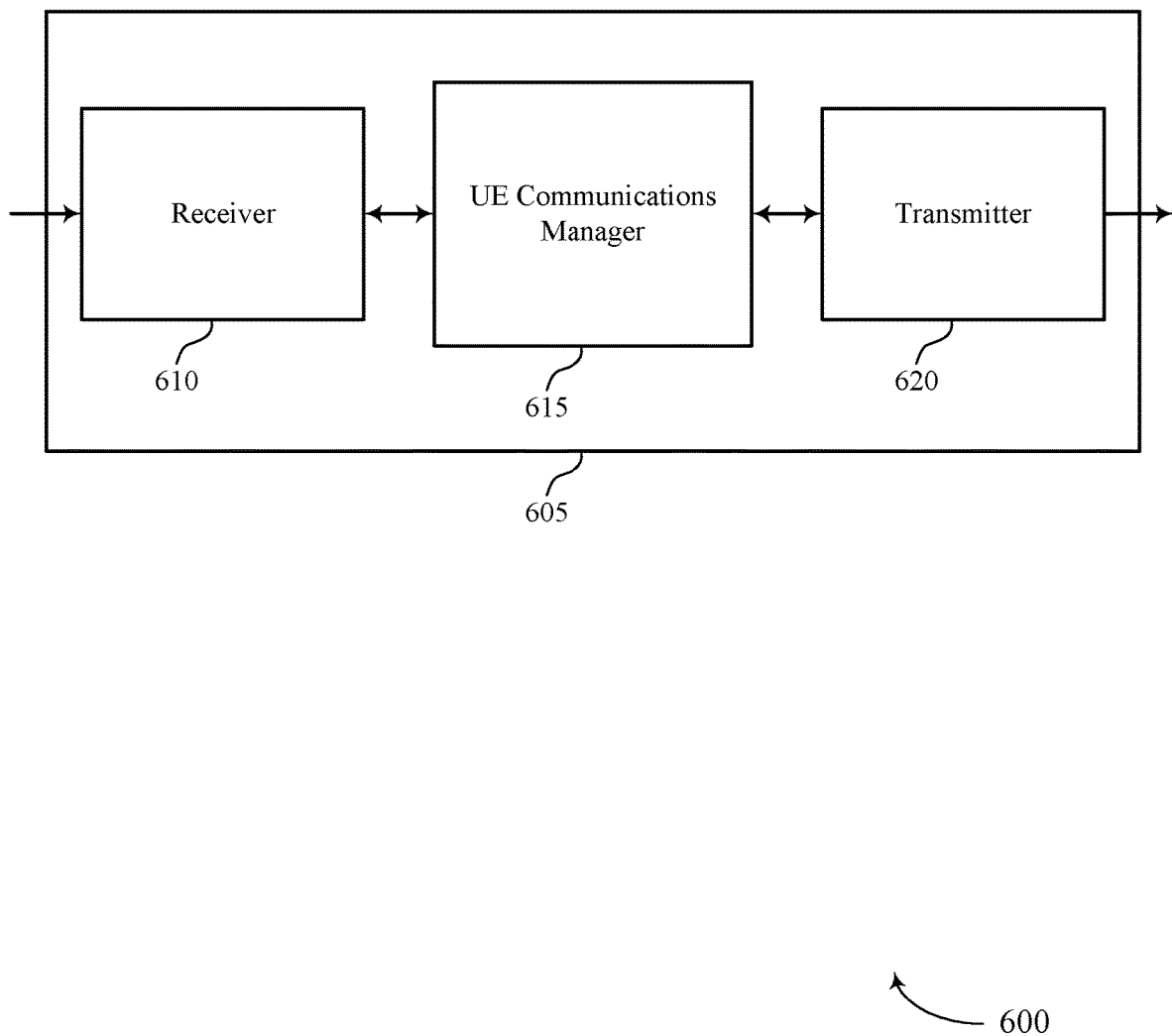
FIGS. 6 through 8 show block diagrams of a device that supports resource splitting among different types of control information and uplink data for a transmission on an uplink shared channel in accordance with aspects of the present disclosure.

FIG. 6 shows a block diagram 600 of a wireless device 605 that supports resource splitting among different types of control information and uplink data for a transmission on an uplink shared channel in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to resource splitting among different types of control information and uplink data for a transmission on an uplink shared channel, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices.

In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, by a UE, a grant indicating a set of REs of an uplink shared channel allocated to the UE for an uplink transmission, split at least a portion of the set of REs between feedback data, CSI part 1 data, and CSI part 2 data, generate the uplink transmission based on the splitting, and transmit, by the UE, the uplink transmission in the set of REs of the uplink shared channel. In some examples of the UE communications manager 615, the set of REs may be split based on a reference payload size of the CSI part 2 data.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
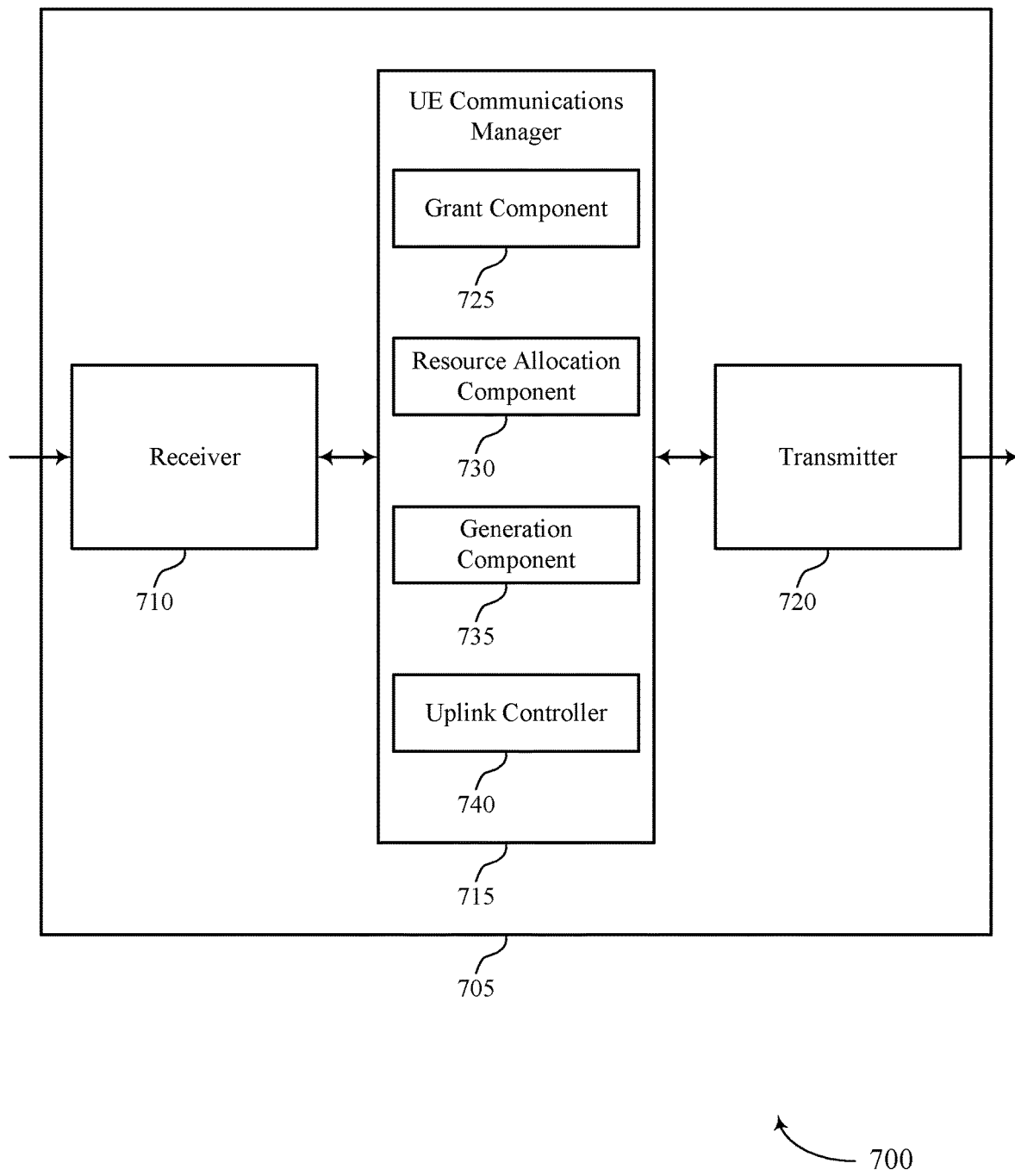

FIG. 7 shows a block diagram 700 of a wireless device 705 that supports resource splitting among different types of control information and uplink data for a transmission on an uplink shared channel in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource splitting among different types of control information and uplink data for a transmission on an uplink shared channel, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include grant component 725, resource allocation component 730, generation component 735, and uplink controller 740.

Grant component 725 may receive, by a UE, a grant indicating a set of REs of an uplink shared channel allocated to the UE for an uplink transmission, determine in some examples a reference payload size based at least on part on a value of a rank indication, process the grant to determine that none of the set of REs are allocated for transmission of uplink data and that each of the set of REs is allocated for transmission of the feedback data, or the CSI part 1 data, or the CSI part 2 data, and process the grant to determine that the uplink transmission is to include non-access stratum data and not to include access stratum data.

Resource allocation component 730 may determine a total number of the set of REs that are available for allocation based on a number of subcarriers associated with the grant and a number of symbol periods associated with in the grant (which is number of subcarriers and number of symbol periods, in some examples, may be indicated in the grant), and split the set of REs between feedback data, CSI part 1 data, and CSI part 2 data. In some examples, splitting of the plurality of REs may include splitting the plurality of REs between the feedback data, the CSI part 1 data, and the CSI part 2 data. In some examples, the splitting may be based at least in part on the reference payload size of the CSI part 2 data. In some examples, splitting of the plurality of REs may include splitting the plurality of REs between the feedback data, the CSI part 1 data, the CSI part 2 data, and uplink data. In some examples, such splitting may be based at least in part on the reference payload size of the CSI part 2 data. In some cases, the feedback data is HARQ-ACK data.

Resource allocation component 730 may also identify a remaining number of the set of REs that are available for allocation based on determining that the number of the set of REs allocated to the feedback data is less than the total number of the set of REs that are available for allocation, split the remaining number of the set of REs between the CSI part 1 data and the CSI part 2 data, set the total number of the set of REs that are available for allocation as a maximum number of the set of REs that are available to allocate to the feedback data.

Resource allocation component 730 may receive control (e.g., RRC) signaling indicating an allocation cap parameter for the feedback data, set a maximum number of the set of REs to allocate to the feedback data based on the allocation cap parameter, where calculating the number of the set of REs to allocate to the feedback data is based on the maximum number, receive control (e.g., RRC) signaling indicating an allocation cap parameter for the CSI part 1 data, and set a maximum number of the set of REs to allocate to the CSI part 1 data based on the allocation cap parameter. In some cases, calculating the number of the set of REs to allocate to the CSI part 1 data is based on the maximum number. In some cases, splitting of the set of REs includes: allocating a number of the set of REs to the feedback data.

Generation component 735 may generate the uplink transmission based on the splitting of the set of REs.

Uplink controller 740 may transmit, by the UE, the uplink transmission in the set of REs of the uplink shared channel.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
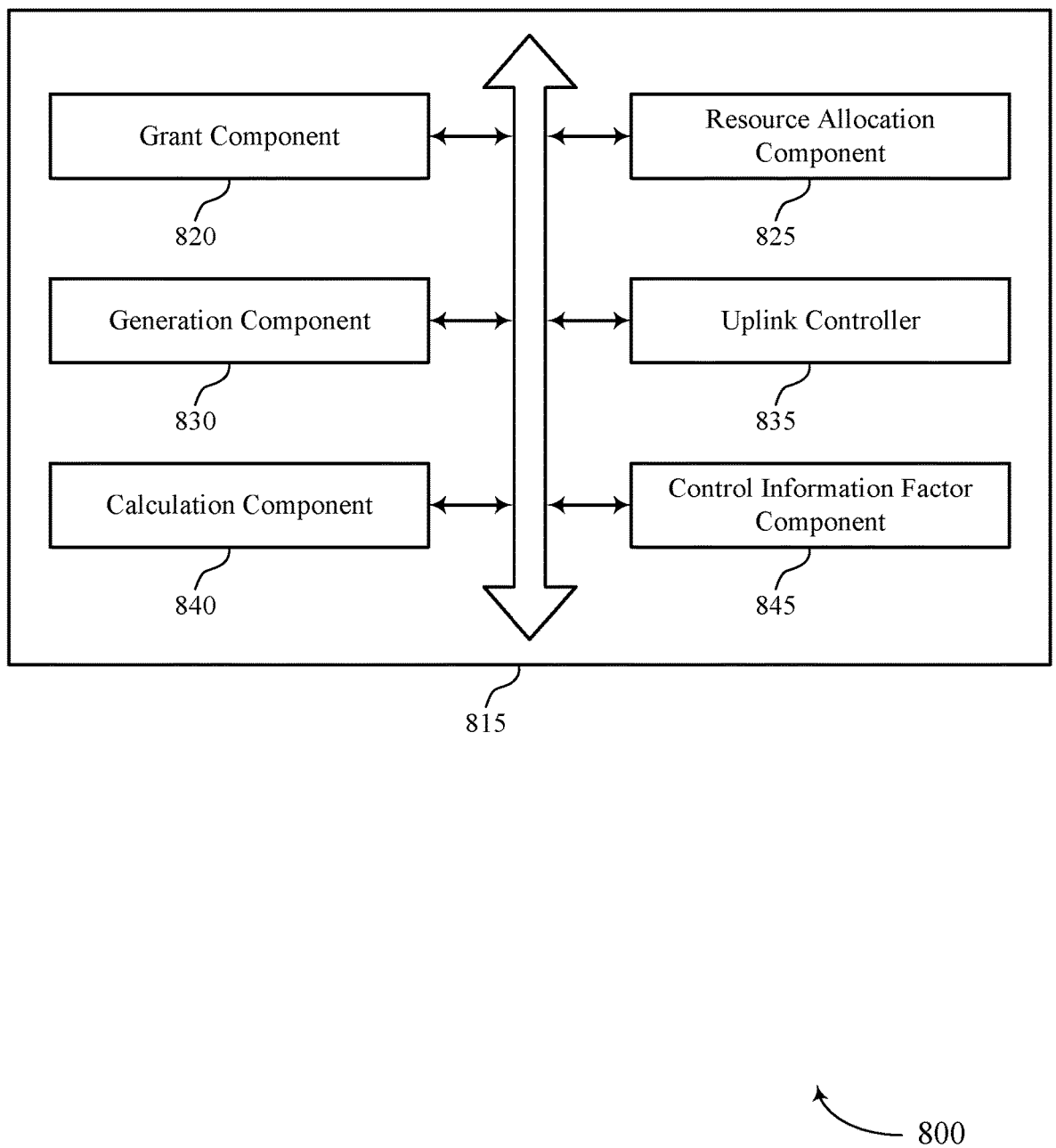

FIG. 8 shows a block diagram 800 of a UE communications manager 815 that supports resource splitting among different types of control information and uplink data for a transmission on an uplink shared channel in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include grant component 820, resource allocation component 825, generation component 830, uplink controller 835, calculation component 840, and control information factor component 845. Each of these modules may communicate, directly or indirectly, with one another (e.g., via one or more buses).

Grant component 820 may receive, by a UE, a grant indicating a set of REs of an uplink shared channel allocated to the UE for an uplink transmission, determine in some examples a reference payload size based at least on part on a value of a rank indication, process the grant to determine that none of the set of REs are allocated for transmission of uplink data and that each of the set of REs is allocated for transmission of the feedback data, or the CSI part 1 data, or the CSI part 2 data, and process the grant to determine that the uplink transmission is to include non-access stratum data and not to include access stratum data.

Resource allocation component 825 may determine a total number of the set of REs that are available for allocation based on a number of subcarriers indicated in the grant and a number of symbol periods indicated in the grant, split at least a portion of the set of REs between feedback data, CSI part 1 data, and CSI part 2 data. In some examples, splitting of the plurality of REs may include splitting the plurality of REs between the feedback data, the CSI part 1 data, and the CSI part 2 data. In some examples, such splitting may be based at least in part on the reference payload size of the CSI part 2 data. In some cases, the feedback data is HARQ-ACK data. In some examples, splitting of the plurality of REs may include splitting the plurality of REs between the feedback data, the CSI part 1 data, the CSI part 2 data, and uplink data. In some examples, such splitting may be based at least in part on the reference payload size of the CSI part 2 data. In some cases, the feedback data is HARQ-ACK data.

In some cases, resource allocation component 825 may identify a remaining number of the set of REs that are available for allocation based on determining that the number of the set of REs allocated to the feedback data is less than the total number of the set of REs that are available for allocation, split the remaining number of the set of REs between the CSI part 1 data and the CSI part 2 data.

In some cases, resource allocation component 825 may set the total number of the set of REs that are available for allocation as a maximum number of the set of REs that are available to allocate to the feedback data, receive control (e.g., RRC) signaling indicating an allocation cap parameter for the feedback data, set a maximum number of the set of REs to allocate to the feedback data based on the allocation cap parameter, where calculating the number of the set of REs to allocate to the feedback data is based on the maximum number, receive control (e.g., RRC) signaling indicating an allocation cap parameter for the CSI part 1 data, and set a maximum number of the set of REs to allocate to the CSI part 1 data based on the allocation cap parameter, where calculating the number of the set of REs to allocate to the CSI part 1 data is based on the maximum number. In some cases, splitting of the set of REs includes: allocating a number of the set of REs to the feedback data.

Generation component 830 may generate the uplink transmission based on the splitting of the set of REs.

Uplink controller 835 may transmit, by the UE, the uplink transmission in the set of REs of the uplink shared channel.

Calculation component 840 may calculate a number of the set of REs for allocation. In some cases, splitting of the set of REs includes: calculating a number of the set of REs to allocate to the feedback data in proportion to a weighted payload size of the feedback data relative to a function of the weighted payload size of the feedback data, a weighted payload size of the CSI part 1 data, and a weighted payload size of a reference payload size.

In some cases, splitting of the set of REs includes: calculating a number of the set of REs to allocate to the CSI part 1 data in proportion to a weighted payload size of the CSI part 1 data relative to a function of a weighted payload size of the feedback data, the weighted payload size of the CSI part 1 data, and a weighted payload size of a reference payload size. Further, calculation component 840 may calculate a number of the set of REs to allocate to the CSI part 2 data based on a number of the set of REs allocated to the feedback data and a number of the set of REs allocated to the CSI part 1 data.

In some cases, splitting of the set of REs includes: calculating a number of the set of REs to allocate to the feedback data in proportion to a weighted payload size of the feedback data relative to a weighted payload size of a reference payload size. In some cases, splitting of the set of REs includes: calculating a number of the set of REs to allocate to the CSI part 1 data in proportion to a weighted payload size of the CSI part 1 data relative to a weighted payload size of a reference payload size.

Control information factor component 845 may determine a weighted payload size of the feedback data based at least on part on the weighting factor for the feedback data, a weighted payload size of the CSI part 1 data based at least on part on the weighting factor for the CSI part 1 data, and a weighted payload size of a reference payload size based at least on part on the weighting factor for the CSI part 2 data. In some cases, splitting of the set of REs includes: receiving control (e.g., RRC) signaling indicating a weighting factor for the feedback data, a weighting factor for the CSI part 1 data, and a weighting factor for the CSI part 2 data.

Figure 9:
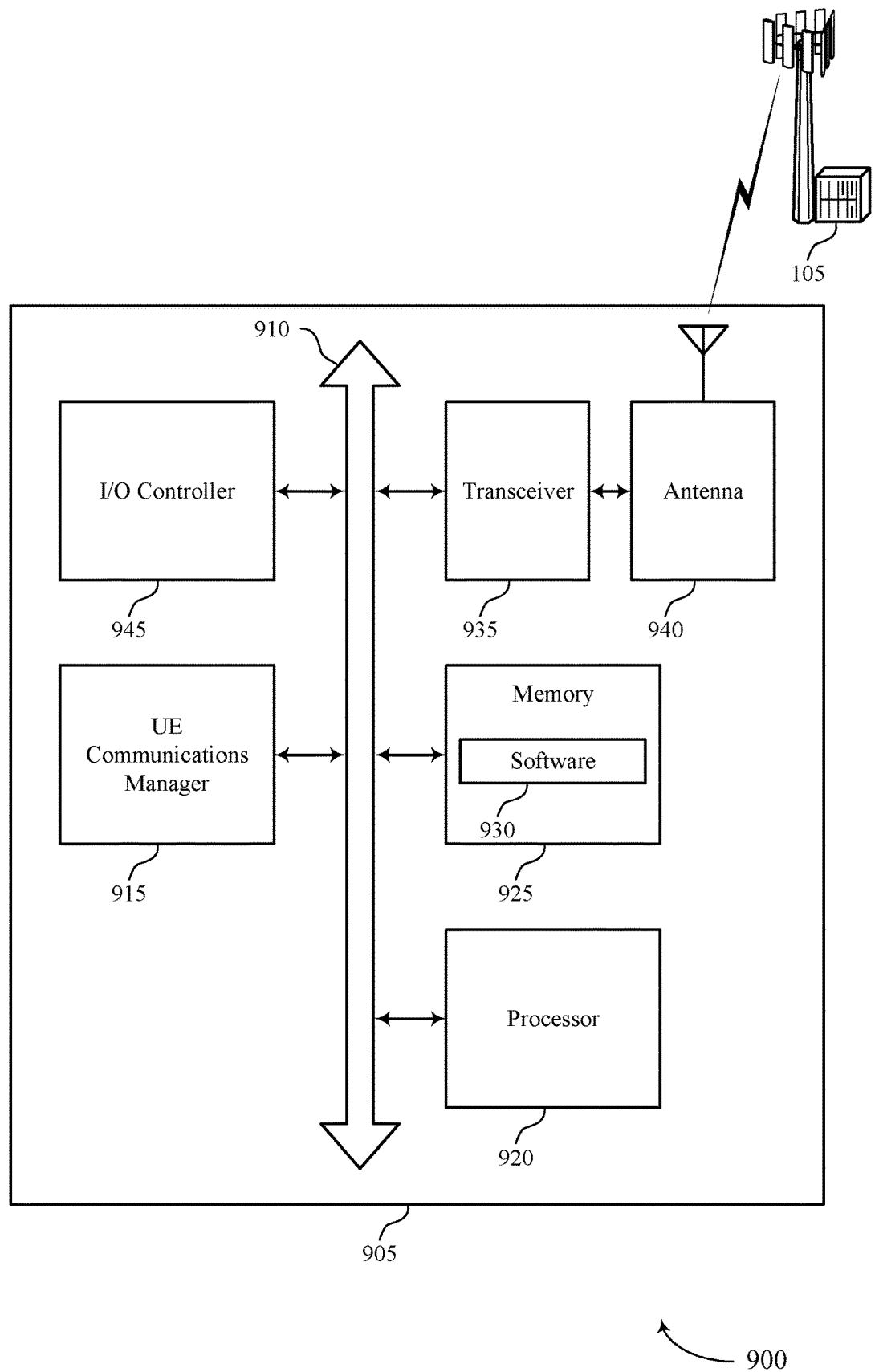
FIG. 9 illustrates a block diagram of a system including a UE that supports resource splitting among different types of control information and uplink data for a transmission on an uplink shared channel in accordance with aspects of the present disclosure.

FIG. 9 shows a diagram of a system 900 including a device 905 that supports resource splitting among different types of control information and uplink data for a transmission on an uplink shared channel in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In some cases, a memory controller may be integrated into processor 920. Processor 920 may be configured to execute computer-readable instructions stored in a memory to perform various functions (e.g., functions or tasks supporting resource splitting among different types of control information and uplink data for a transmission on an uplink shared channel).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support resource splitting among different types of control information and uplink data for a transmission on an uplink shared channel. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In some cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
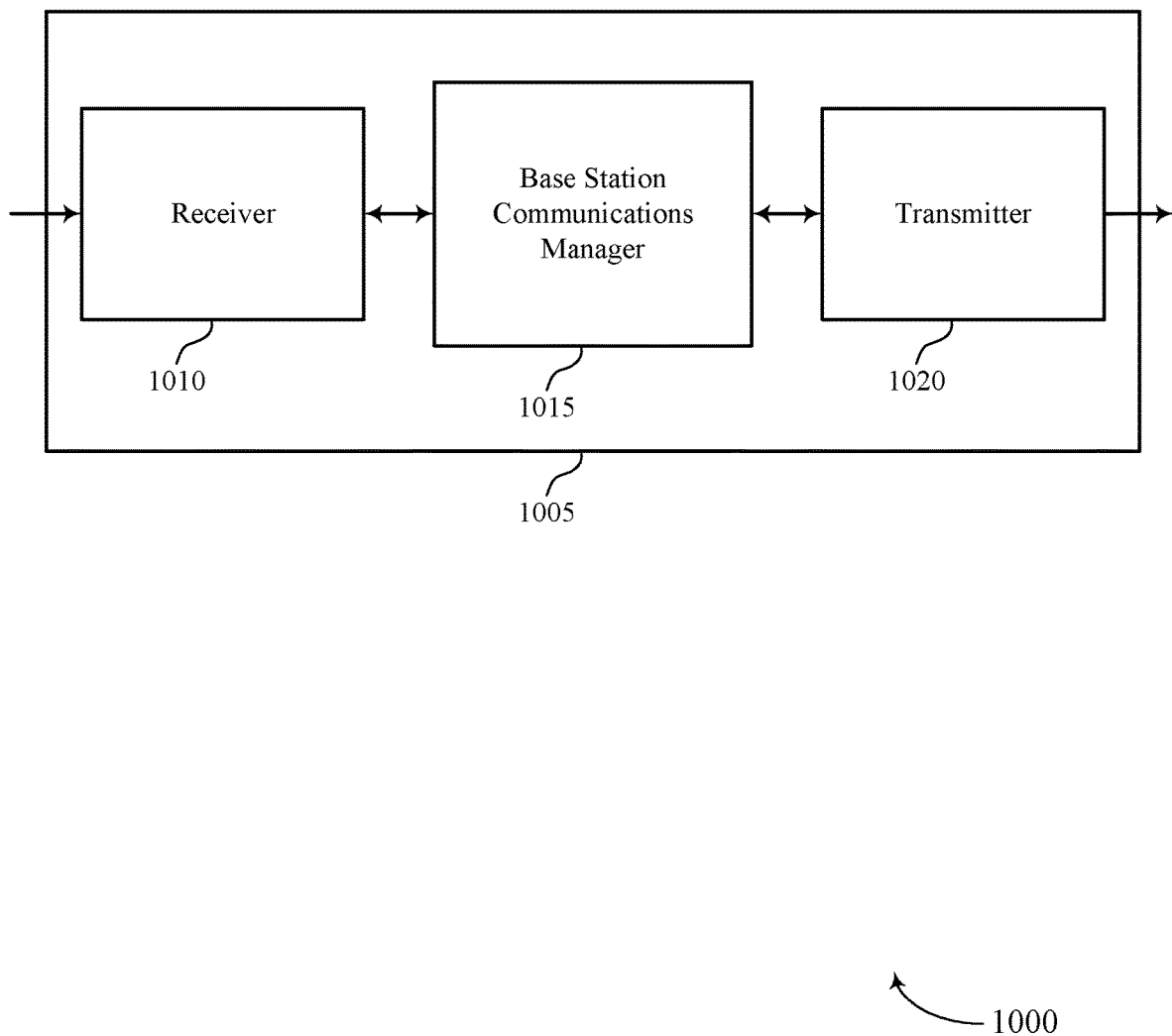
FIGS. 10 through 12 show block diagrams of a device that supports resource splitting among different types of control information and uplink data for a transmission on an uplink shared channel in accordance with aspects of the present disclosure.

FIG. 10 shows a block diagram 1000 of a wireless device 1005 that supports resource splitting among different types of control information and uplink data for a transmission on an uplink shared channel in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to resource splitting among different types of control information and uplink data for a transmission on an uplink shared channel, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices.

In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit, by a base station, a grant indicating a set of REs of an uplink shared channel allocated to a UE for an uplink transmission, split the set of REs between feedback data, CSI part 1 data, and CSI part 2 data, and monitor the set of REs of the uplink shared channel for the uplink transmission based on the splitting of the set of REs. In some examples, splitting of the plurality of REs may include splitting the plurality of REs between the feedback data, the CSI part 1 data, and the CSI part 2 data. In some examples, the splitting may be based at least in part on a reference payload size of the CSI part 2 data. In some examples, splitting of the plurality of REs may include splitting the plurality of REs between the feedback data, the CSI part 1 data, the CSI part 2 data, and uplink data. In some examples, such splitting may be based at least in part on a reference payload size of the CSI part 2 data.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
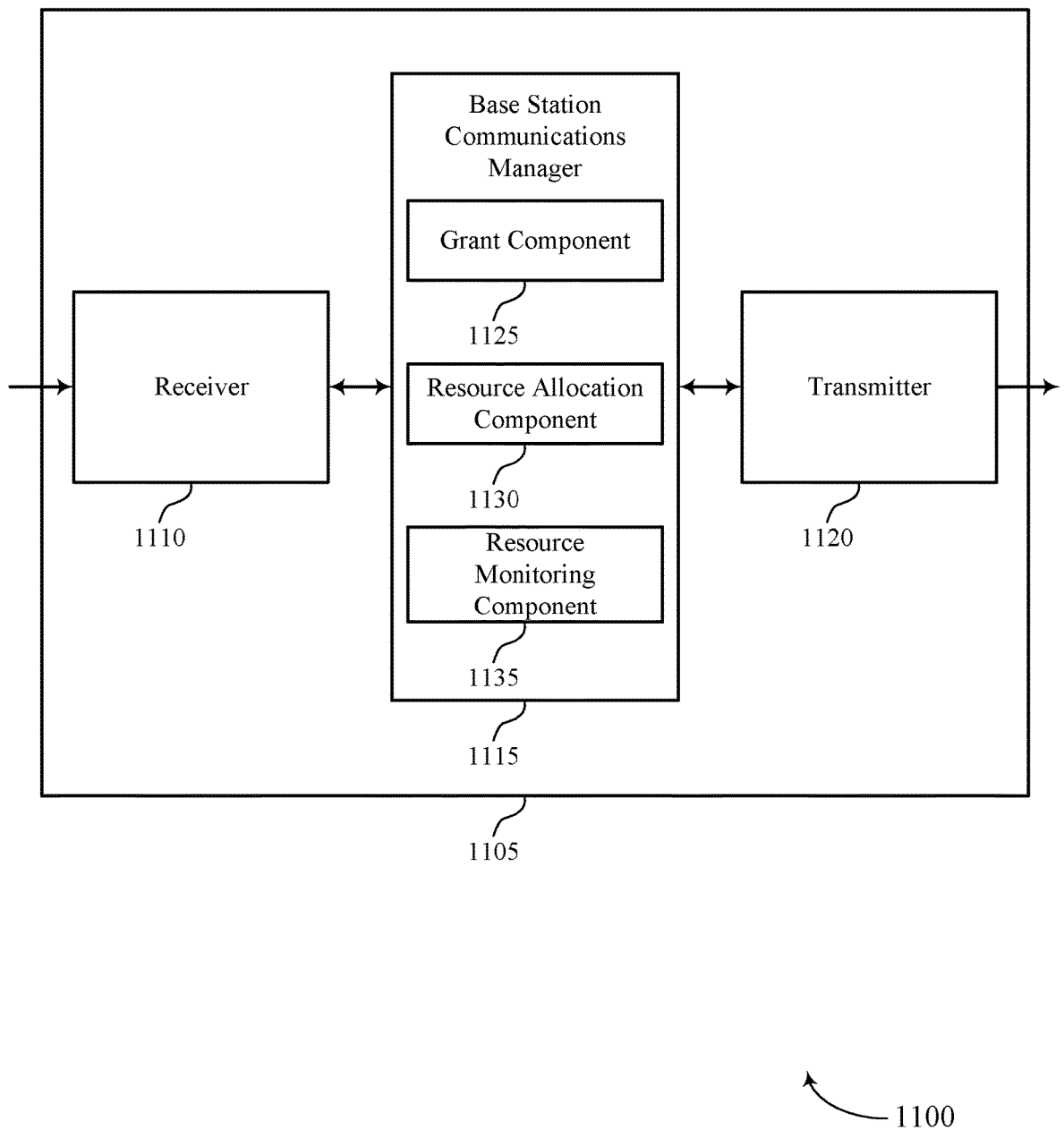

FIG. 11 shows a block diagram 1100 of a wireless device 1105 that supports resource splitting among different types of control information and uplink data for a transmission on an uplink shared channel in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to resource splitting among different types of control information and uplink data for a transmission on an uplink shared channel, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include grant component 1125, resource allocation component 1130, and resource monitoring component 1135.

Grant component 1125 may transmit, by a base station, a grant indicating a set of REs of an uplink shared channel allocated to a UE for an uplink transmission. In some cases, transmitting the grant further includes: generating the grant to indicate that none of the total number of the set of REs are allocated for transmission of uplink data and that each of total number of the set of REs is allocated for transmission of the feedback data, the CSI part 1 data, or the CSI part 2 data. In some cases, transmitting the grant further includes: generating the grant to indicate that the uplink transmission is to include non-access stratum data and not to include access stratum data.

Resource allocation component 1130 may split at least a portion of the set of REs between feedback data, CSI part 1 data, and CSI part 2 data, determine a total number of the set of REs that are available for allocation based on a number of subcarriers indicated in the grant and a number of symbol periods indicated in the grant, and in some examples determine a reference payload size based at least on part on a value of a rank indication. In some cases, splitting of the set of REs includes: splitting the set of REs between the feedback data, the CSI part 1 data, and the CSI part 2 data. In some examples, such splitting may be based on the reference payload size of the CSI part 2 data. In some cases, splitting of the set of REs includes: splitting the set of REs between the feedback data, the CSI part 1 data, and the CSI part 2 data. In some examples, such splitting may be based on the total number of the set of REs that are available for allocation.

In some cases, the total number of the set of REs that are available for allocation excludes REs of the set of REs assigned to at least one reference signal. In some examples, splitting of at least a portion of the plurality of REs may include splitting the plurality of REs between the feedback data, the CSI part 1 data, the CSI part 2 data, and uplink data. In some examples, such splitting may be based at least in part on a reference payload size of the CSI part 2 data. In some cases, the feedback data is HARQ-ACK data.

Resource monitoring component 1135 may monitor the set of REs of the uplink shared channel for the uplink transmission based on the splitting of the set of REs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
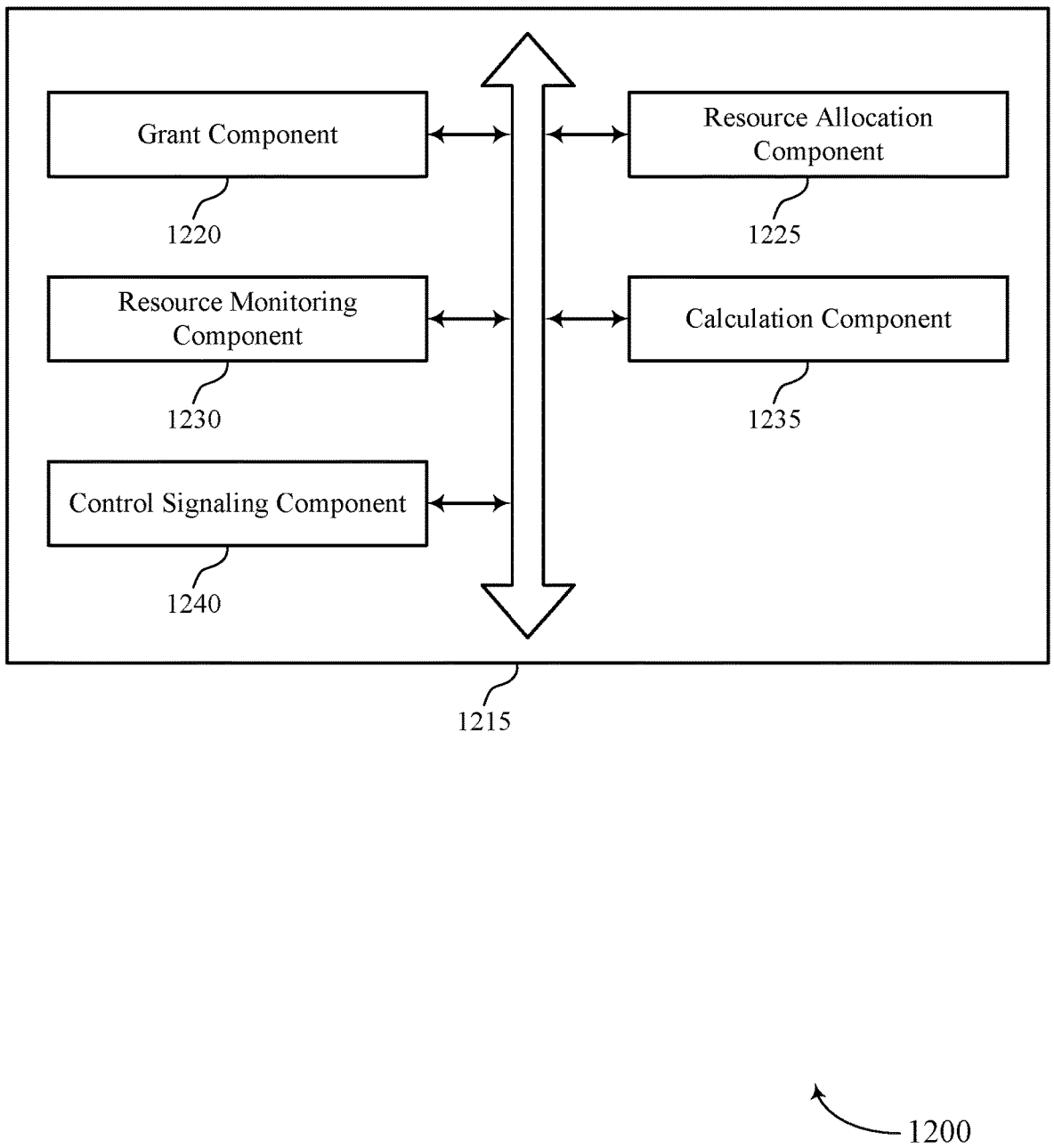

FIG. 12 shows a block diagram 1200 of a base station communications manager 1215 that supports resource splitting among different types of control information and uplink data for a transmission on an uplink shared channel in accordance with aspects of the present disclosure. The base station communications manager 1215 may be an example of aspects of a base station communications manager 1315 described with reference to FIGS. 10, 11, and 13. The base station communications manager 1215 may include grant component 1220, resource allocation component 1225, resource monitoring component 1230, calculation component 1235, and control (e.g., RRC) signaling component 1240. Each of these modules may communicate, directly or indirectly, with one another (e.g., via one or more buses).

Grant component 1220 may transmit, by a base station, a grant indicating a set of REs of an uplink shared channel allocated to a UE for an uplink transmission. In some cases, transmitting the grant further includes: generating the grant to indicate that none of the total number of the set of REs are allocated for transmission of uplink data and that each of total number of the set of REs is allocated for transmission of the feedback data, the CSI part 1 data, or the CSI part 2 data. In some cases, transmitting the grant further includes: generating the grant to indicate that the uplink transmission is to include non-access stratum data and not to include access stratum data.

Resource allocation component 1225 may split at least a portion of the set of REs between feedback data, CSI part 1 data, and CSI part 2 data, determine a total number of the set of REs that are available for allocation based on a number of subcarriers indicated in the grant and a number of symbol periods indicated in the grant, and determine the reference payload size based at least on part on a value of a rank indication. In some examples, splitting of the plurality of REs may include splitting the plurality of REs between the feedback data, the CSI part 1 data, and the CSI part 2 data, based at least in part on the reference payload size of the CSI part 2 data. In some cases, splitting of the set of REs includes: splitting the set of REs between the feedback data, the CSI part 1 data, and the CSI part 2 data based on the total number of the set of REs that are available for allocation.

In some cases, the total number of the set of REs that are available for allocation excludes REs of the set of REs assigned to at least one reference signal. In some examples, splitting of at least a portion of the plurality of REs may include splitting the plurality of REs between the feedback data, the CSI part 1 data, the CSI part 2 data, and uplink data. In some examples, the splitting may be based at least in part on the reference payload size of the CSI part 2 data. In some cases, the feedback data is HARQ-ACK data.

Resource monitoring component 1230 may monitor the set of REs of the uplink shared channel for the uplink transmission based on the splitting of the set of REs.

Calculation component 1235 may calculate a number of the set of REs allocated to the CSI part 1 data based on the maximum number of the set of REs available to allocate to the CSI part 1 data. In some cases, splitting of the set of REs includes: calculating a number of the set of REs allocated to the feedback data in proportion to a weighted payload size of the feedback data relative to a function of the weighted payload size of the feedback data, a weighted payload size of the CSI part 1 data, and a weighted payload size of a reference payload size.

In some cases, splitting of the set of REs includes: calculating a number of the set of REs allocated to the CSI part 1 data in proportion to a weighted payload size of the CSI part 1 data relative to a function of a weighted payload size of the feedback data, the weighted payload size of the CSI part 1 data, and a weighted payload size of a reference payload size. In some cases, splitting of the set of REs includes: calculating a number of the set of REs allocated to the CSI part 2 data based on a number of the set of REs allocated to the feedback data and a number of the set of REs allocated to the CSI part 1 data. In some cases, splitting of the set of REs includes: calculating a number of the set of REs allocated to the feedback data based on the maximum number of the set of REs available to allocate to the feedback data.

Control (e.g., RRC) signaling component 1240 may determine a weighted payload size of the feedback data based at least on part on the weighting factor for the feedback data, a weighted payload size of the CSI part 1 data based at least on part on the weighting factor for the CSI part 1 data, and a weighted payload size of a reference payload size based at least on part on the weighting factor for the CSI part 2 data, transmit control (e.g., RRC) signaling indicating a first allocation cap parameter for the feedback data and for the CSI part 1 data, and set a maximum number of the set of REs available to allocate to the CSI part 1 data based at least in part on the first allocation cap parameter.

In some cases, splitting of the set of REs includes: transmitting control (e.g., RRC) signaling indicating a weighting factor for the feedback data, a weighting factor for the CSI part 1 data, and a weighting factor for the CSI part 2 data. In some cases, splitting of the set of REs includes: setting a maximum number of the set of REs available to allocate to the feedback data based on the first allocation cap parameter.

Figure 13:
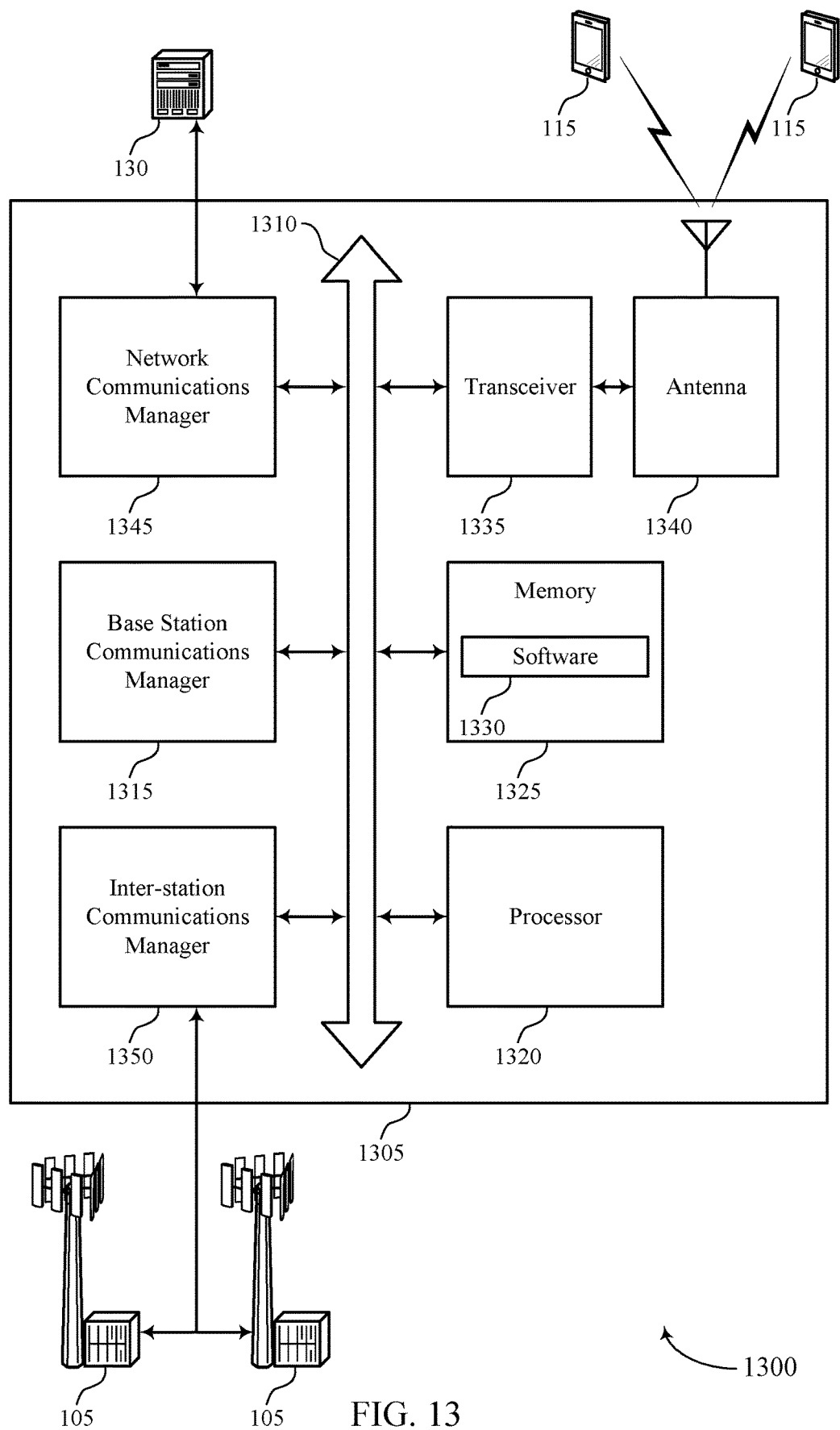
FIG. 13 illustrates a block diagram of a system including a base station that supports resource splitting among different types of control information and uplink data for a transmission on an uplink shared channel in accordance with aspects of the present disclosure.

FIG. 13 shows a diagram of a system 1300 including a device 1305 that supports resource splitting among different types of control information and uplink data for a transmission on an uplink shared channel in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In some cases, a memory controller may be integrated into processor 1320. Processor 1320 may be configured to execute computer-readable instructions stored in a memory to perform various functions (e.g., functions or tasks supporting resource splitting among different types of control information and uplink data for a transmission on an uplink shared channel).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support resource splitting among different types of control information and uplink data for a transmission on an uplink shared channel. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
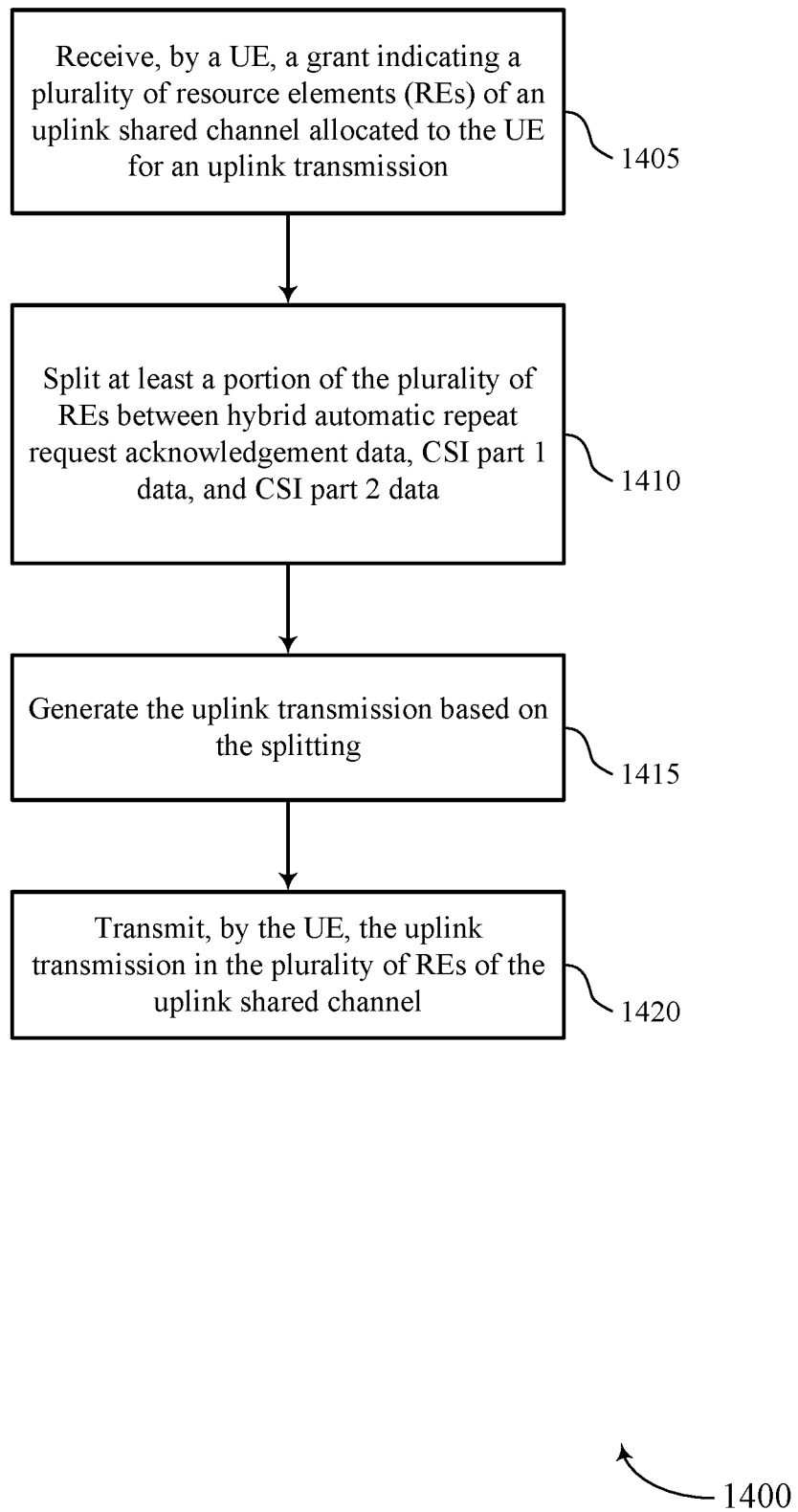
FIGS. 14 through 17 illustrate methods for resource splitting among different types of control information and uplink data for a transmission on an uplink shared channel in accordance with aspects of the present disclosure.

FIG. 14 shows a flowchart illustrating a method 1400 for resource splitting among different types of control information and uplink data for a transmission on an uplink shared channel in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a grant indicating a plurality of REs of an uplink shared channel allocated to the UE for an uplink transmission. The operations of 1405 may be performed according to the methods described herein. In certain examples, aspects of the operations of 1405 may be performed by a grant component as described with reference to FIGS. 6 through 9.

At 1410 the UE 115 may split at least a portion of the plurality of REs between feedback data (e.g., HARK-ACK data), CSI part 1 data, and CSI part 2 data. In some examples, splitting of the plurality of REs of 1410 may include splitting the plurality of REs between the feedback data (e.g., HARQ-ACK data), the CSI part 1 data, and the CSI part 2 data. In some examples, splitting of the plurality of REs of 1410 may include splitting the plurality of REs between the feedback data (e.g., HARQ-ACK data), the CSI part 1 data, the CSI part 2 data, and uplink data. In some examples, the splitting may be based at least in part on the reference payload size of the CSI part 2 data. The operations of 1410 may be performed according to the methods described herein. In certain examples, aspects of the operations of 1410 may be performed by a resource allocation component as described with reference to FIGS. 6 through 9.

At 1415 the UE 115 may generate the uplink transmission based at least in part on the splitting. The operations of 1415 may be performed according to the methods described herein. In certain examples, aspects of the operations of 1415 may be performed by a generation component as described with reference to FIGS. 6 through 9.

At 1420 the UE 115 may transmit, by the UE, the uplink transmission in the plurality of REs of the uplink shared channel. The operations of 1420 may be performed according to the methods described herein. In certain examples, aspects of the operations of 1420 may be performed by an uplink controller as described with reference to FIGS. 6 through 9.

Figure 15:
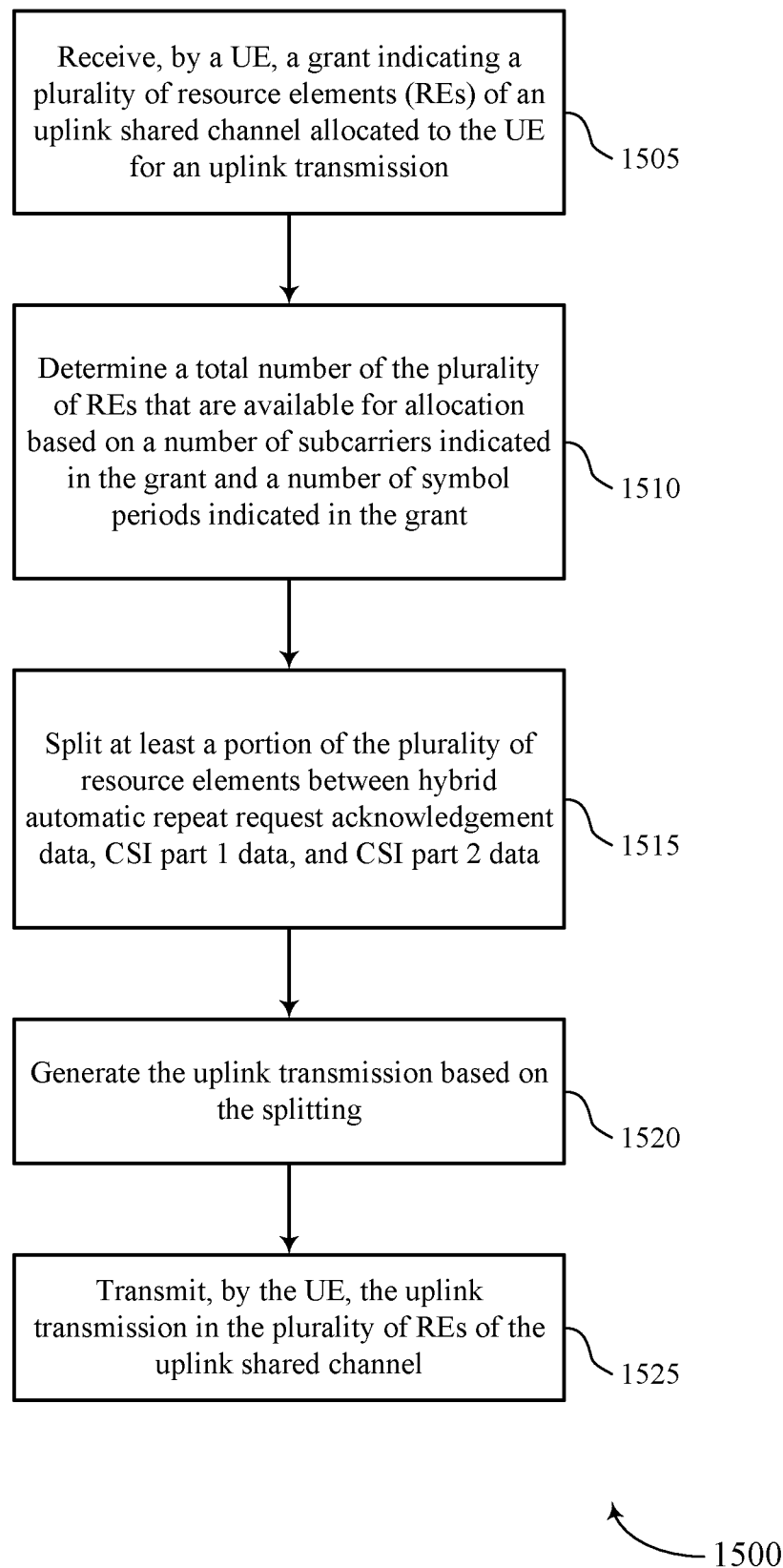

FIG. 15 shows a flowchart illustrating a method 1500 for resource splitting among different types of control information and uplink data for a transmission on an uplink shared channel in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a grant indicating a plurality of REs of an uplink shared channel allocated to the UE for an uplink transmission. The operations of 1505 may be performed according to the methods described herein. In certain examples, aspects of the operations of 1505 may be performed by a grant component as described with reference to FIGS. 6 through 9.

At 1510 the UE 115 may determine a total number of the plurality of REs that are available for allocation based at least in part on a number of subcarriers indicated in the grant and a number of symbol periods indicated in the grant. The operations of 1510 may be performed according to the methods described herein. In certain examples, aspects of the operations of 1510 may be performed by a resource allocation component as described with reference to FIGS. 6 through 9.

At 1515 the UE 115 may split at least a portion of the plurality of REs between HARQ-ACK data, CSI part 1 data, and CSI part 2 data. In some examples the splitting of 1515 may be based at least in part on a reference payload size of the CSI part 2 data. In some examples the splitting of 1515 may be between HARQ-ACK data, CSI part 1 data, CSI part 2 data, and uplink data. The operations of 1515 may be performed according to the methods described herein. In certain examples, aspects of the operations of 1515 may be performed by a resource allocation component as described with reference to FIGS. 6 through 9.

At 1520 the UE 115 may generate the uplink transmission based at least in part on the splitting. The operations of 1520 may be performed according to the methods described herein. In certain examples, aspects of the operations of 1520 may be performed by a generation component as described with reference to FIGS. 6 through 9.

At 1525 the UE 115 may transmit, by the UE, the uplink transmission in the plurality of REs of the uplink shared channel. The operations of 1525 may be performed according to the methods described herein. In certain examples, aspects of the operations of 1525 may be performed by an uplink controller as described with reference to FIGS. 6 through 9.

Figure 16:
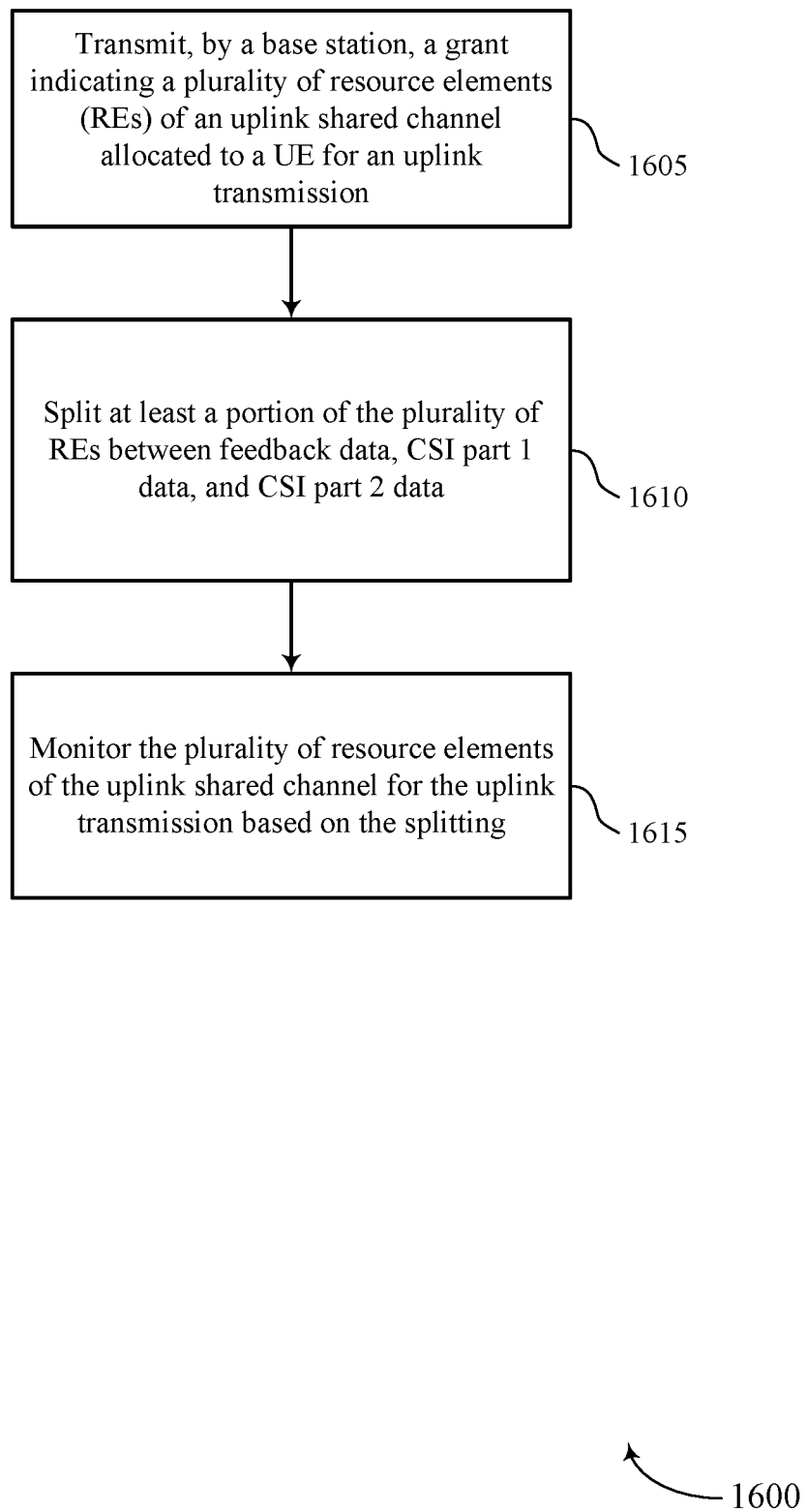

FIG. 16 shows a flowchart illustrating a method 1600 for resource splitting among different types of control information and uplink data for a transmission on an uplink shared channel in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit a grant indicating a plurality of REs of an uplink shared channel allocated to a UE for an uplink transmission. The operations of 1605 may be performed according to the methods described herein. In certain examples, aspects of the operations of 1605 may be performed by a grant component as described with reference to FIGS. 10 through 13.

At 1610 the base station 105 may split at least a portion of the plurality of REs between feedback data (e.g., HARQ-ACK data), CSI part 1 data, and CSI part 2 data. In some examples, the splitting of 1610 may be based at least in part on a reference payload size of the CSI part 2 data. In some examples, the splitting of 1610 may be between feedback data (e.g., HARQ-ACK data), CSI part 1 data, CSI part 2 data, and uplink data. The operations of 1610 may be performed according to the methods described herein. In certain examples, aspects of the operations of 1610 may be performed by a resource allocation component as described with reference to FIGS. 10 through 13.

At 1615 the base station 105 may monitor the plurality of REs of the uplink shared channel for the uplink transmission based at least in part on the splitting. The operations of 1615 may be performed according to the methods described herein. In certain examples, aspects of the operations of 1615 may be performed by a resource monitoring component as described with reference to FIGS. 10 through 13.

Figure 17:
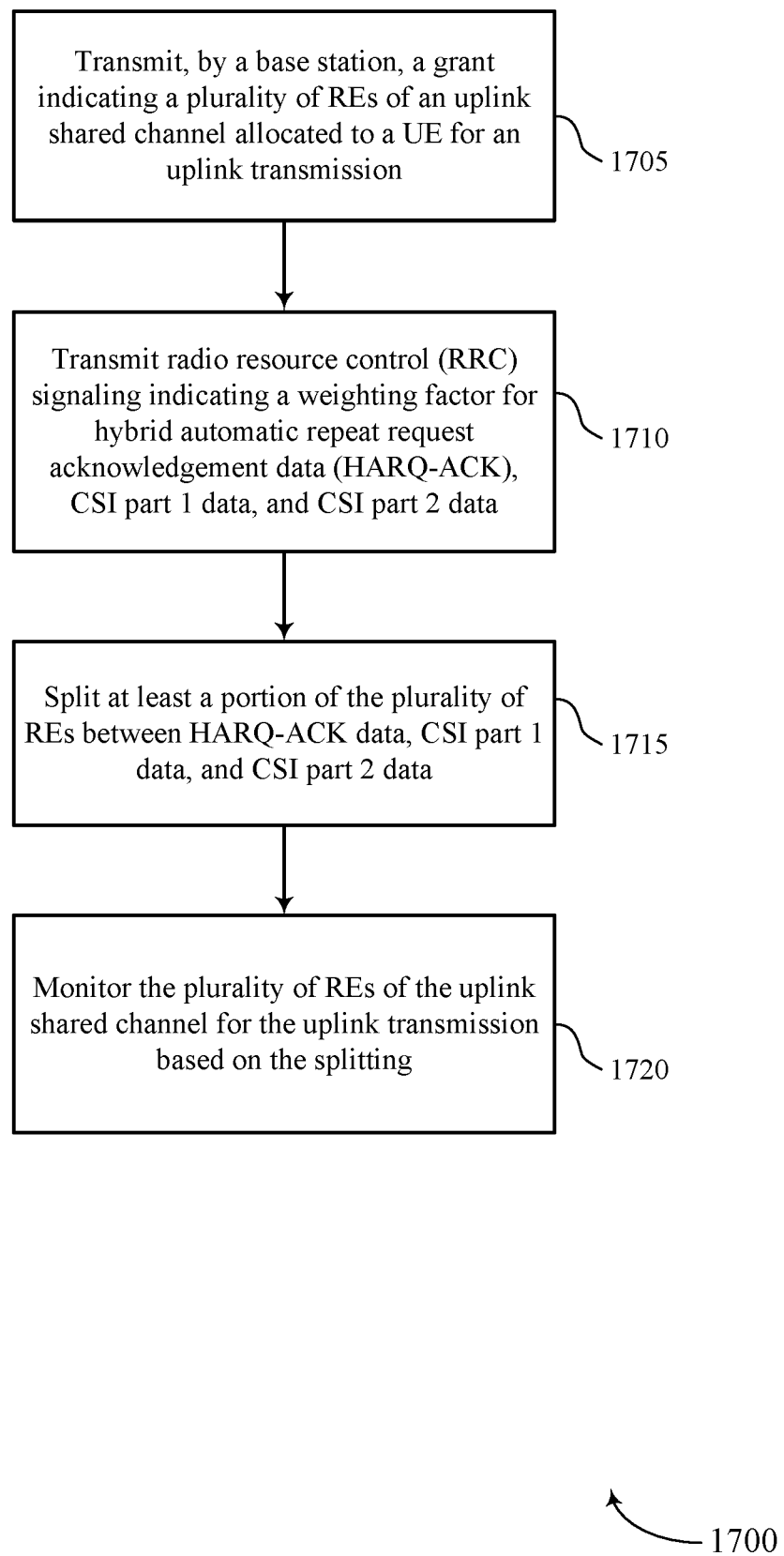

FIG. 17 shows a flowchart illustrating a method 1700 for resource splitting among different types of control information and uplink data for a transmission on an uplink shared channel in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a grant indicating a plurality of REs of an uplink shared channel allocated to a UE for an uplink transmission. The operations of 1705 may be performed according to the methods described herein. In certain examples, aspects of the operations of 1705 may be performed by a grant component as described with reference to FIGS. 10 through 13.

At 1710 the base station 105 may transmit control (e.g., RRC) signaling indicating a weighting factor for HARQ-ACK data, CSI part 1 data, and CSI part 2 data. The operations of 1720 may be performed according to the methods described herein. In certain examples, aspects of the operations of 1720 may be performed by a control (e.g., RRC) signaling component as described with reference to FIGS. 10 through 13.

At 1715 the base station 105 may split at least a portion of the plurality of REs between feedback data, CSI part 1 data, and CSI part 2 data. In some examples the splitting of 1715 may be based at least in part on a reference payload size of the CSI part 2 data. In some cases, splitting of the plurality of REs includes: transmitting control (e.g., RRC) signaling indicating a weighting factor for the feedback data, a weighting factor for the CSI part 1 data, and a weighting factor for the CSI part 2 data. In some examples the splitting of 1715 may be between feedback data, CSI part 1 data, CSI part 2 data, and uplink data. The operations of 1710 may be performed according to the methods described herein. In certain examples, aspects of the operations of 1710 may be performed by a resource allocation component as described with reference to FIGS. 10 through 13.

At 1720 the base station 105 may monitor the plurality of REs of the uplink shared channel for the uplink transmission based at least in part on the splitting. The operations of 1715 may be performed according to the methods described herein. In certain examples, aspects of the operations of 1715 may be performed by a resource monitoring component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, by a user equipment (UE), a grant indicating a plurality of resource elements (REs) of an uplink shared channel allocated to the UE for an uplink transmission;
receiving radio resource control (RRC) signaling indicating an allocation cap parameter;
setting a maximum number of the plurality of REs to allocate to hybrid automatic repeat request acknowledgement (HARQ-ACK) data based at least in part on the allocation cap parameter;
splitting at least a portion of the plurality of REs between the HARQ-ACK data, channel state information part 1 (CSI part 1) data, and CSI part 2 data;
generating the uplink transmission based at least in part on the splitting; and
transmitting, by the UE, the uplink transmission in the plurality of REs of the uplink shared channel.

2. The method of claim 1, further comprising:
calculating a number of the plurality of REs to allocate to the HARQ-ACK data based at least in part on the maximum number.

3. The method of claim 1, further comprising:
determining a total number of the plurality of REs that are available for allocation based at least in part on a number of subcarriers associated with the grant and a number of symbol periods associated with the grant.

4. The method of claim 3, further comprising:
setting the total number of the plurality of REs that are available for allocation as a maximum number of the plurality of REs that are available to allocate to the HARQ-ACK data.

5. The method of claim 3, wherein splitting of at least the portion of the plurality of REs comprises:
allocating a number of the plurality of REs to the HARQ-ACK data;
identifying a remaining number of the plurality of REs that are available for allocation based at least in part on determining that the number of the plurality of REs allocated to the HARQ-ACK data is less than the total number of the plurality of REs that are available for allocation; and
splitting the remaining number of the plurality of REs between the CSI part 1 data and the CSI part 2 data.

6. The method of claim 1, further comprising:
receiving the RRC signaling indicating the allocation cap parameter; and
setting a maximum number of the plurality of REs to allocate to the CSI part 1 data based at least in part on the allocation cap parameter.

7. The method of claim 6, further comprising:
calculating a number of the plurality of REs to allocate to the CSI part 1 data based at least in part on the maximum number.

8. The method of claim 1, wherein splitting of at least the portion of the plurality of REs comprises:
calculating a number of the plurality of REs to allocate to the HARQ-ACK data in proportion to a weighted payload size of the HARQ-ACK data relative to a function of the weighted payload size of the HARQ-ACK data, a weighted payload size of the CSI part 1 data, and a weighted payload size of a reference payload size.

9. The method of claim 1, wherein splitting of at least the portion of the plurality of REs comprises:
calculating a number of the plurality of REs to allocate to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

10. The method of claim 1, wherein splitting of at least the portion of the plurality of REs comprises:
receiving radio resource control (RRC) signaling indicating a weighting factor for the HARQ-ACK data, a weighting factor for the CSI part 1 data, and a weighting factor for the CSI part 2 data; and
determining a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

11. The method of claim 1, wherein splitting of at least the portion of the plurality of REs comprises:
calculating a number of the plurality of REs to allocate to the CSI part 2 data based at least in part on a number of the plurality of REs allocated to the HARQ-ACK data and a number of the plurality of REs allocated to the CSI part 1 data.

12. The method of claim 1, wherein splitting of at least the portion of the plurality of REs comprises:
calculating a number of the plurality of REs to allocate to the HARQ-ACK data in proportion to a weighted payload size of the HARQ-ACK data relative to a weighted payload size of a reference payload size.

13. The method of claim 1, wherein splitting of at least the portion of the plurality of REs comprises:
calculating a number of the plurality of REs to allocate to the CSI part 1 data in proportion to a weighted payload size of the CSI part 1 data relative to a weighted payload size of a reference payload size.

14. The method of claim 1, further comprising:
determining a reference payload size based at least on part on a value of a rank indication.

15. The method of claim 1, further comprising:
processing the grant to determine that none of the plurality of REs are allocated for transmission of uplink data and that each of the plurality of REs is allocated for transmission of the HARQ-ACK data, or the CSI part 1 data, or the CSI part 2 data.

16. The method of claim 1, further comprising:
processing the grant to determine that the uplink transmission is to include non-access stratum data and not to include access stratum data.

17. The method of claim 1, wherein splitting of at least the portion of the plurality of REs comprises:
splitting at least the portion of the plurality of REs between the HARQ-ACK data, the CSI part 1 data, the CSI part 2 data, and uplink data based at least in part on a reference payload size of the CSI part 2 data.

18. A method for wireless communication, comprising:
transmitting, by a base station, a grant indicating a plurality of resource elements (REs) of an uplink shared channel allocated to a user equipment (UE) for an uplink transmission;
transmitting radio resource control (RRC) signaling indicating an allocation cap parameter;
setting a maximum number of the plurality of REs available to allocate to hybrid automatic repeat request acknowledgement (HARQ-ACK) data based at least in part on the allocation cap parameter;
splitting at least a portion of the plurality of REs between the HARQ-ACK data, channel state information part 1 (CSI part 1) data, and CSI part 2 data; and
monitoring the plurality of REs of the uplink shared channel for the uplink transmission based at least in part on the splitting.

19. The method of claim 18, wherein splitting of at least the portion of the plurality of REs comprises:
calculating a number of the plurality of REs allocated to the HARQ-ACK data based at least in part on the maximum number of the plurality of REs available to allocate to the HARQ-ACK data.

20. The method of claim 18, wherein splitting of at least the portion of the plurality of REs comprises:
setting a maximum number of the plurality of REs available to allocate to the CSI part 1 data based at least in part on the allocation cap parameter.

21. The method of claim 20, wherein splitting of at least the portion of the plurality of REs comprises:
calculating a number of the plurality of REs allocated to the CSI part 1 data based at least in part on the maximum number of the plurality of REs available to allocate to the CSI part 1 data.

22. The method of claim 18, further comprising:
determining a total number of the plurality of REs that are available for allocation based at least in part on a number of subcarriers associated with the grant and a number of symbol periods associated with the grant.

23. The method of claim 22, wherein splitting of at least the portion of the plurality of REs comprises:
splitting at least the portion of the plurality of REs between the HARQ-ACK data, the CSI part 1 data, and the CSI part 2 data based at least in part on the total number of the plurality of REs that are available for allocation.

24. The method of claim 22, wherein the total number of the plurality of REs that are available for allocation excludes REs of the plurality of REs assigned to at least one reference signal.

25. The method of claim 22, wherein transmitting the grant further comprises:
generating the grant to indicate that none of the total number of the plurality of REs are allocated for transmission of uplink data and that each of total number of the plurality of REs is allocated for transmission of the HARQ-ACK data, the CSI part 1 data, or the CSI part 2 data.

26. The method of claim 22, wherein transmitting the grant further comprises:
generating the grant to indicate that the uplink transmission is to include non-access stratum data and not to include access stratum data.

27. The method of claim 18, wherein splitting of at least the portion of the plurality of REs comprises:
calculating a number of the plurality of REs allocated to the HARQ-ACK data in proportion to a weighted payload size of the HARQ-ACK data relative to a function of the weighted payload size of the HARQ-ACK data, a weighted payload size of the CSI part 1 data, and a weighted payload size of a reference payload size.

28. The method of claim 18, wherein splitting of at least the portion of the plurality of REs comprises:
calculating a number of the plurality of REs allocated to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

29. The method of claim 18, wherein splitting of at least the portion of the plurality of REs comprises:
transmitting radio resource control (RRC) signaling indicating a weighting factor for the HARQ-ACK data, a weighting factor for the CSI part 1 data, and a weighting factor for the CSI part 2 data; and
determining a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

30. The method of claim 18, wherein splitting of at least the portion of the plurality of REs comprises:
calculating a number of the plurality of REs allocated to the CSI part 2 data based at least in part on a number of the plurality of REs allocated to the HARQ-ACK data and a number of the plurality of REs allocated to the CSI part 1 data.

31. The method of claim 18, further comprising:
determining a reference payload size based at least on part on a value of a rank indication.

32. The method of claim 18, wherein splitting of at least the portion of the plurality of REs comprises:
splitting at least the portion of the plurality of REs between the HARQ-ACK data, the CSI part 1 data, the CSI part 2 data, and uplink data based at least in part on a reference payload size of the CSI part 2 data.

33. An apparatus for wireless communication by a user equipment (UE), comprising:
a processor;
memory in electronic communication with the processor; and
instructions stored in the memory and executable by the processor to cause the apparatus to:
receive a grant indicating a plurality of resource elements (REs) of an uplink shared channel allocated to the UE for an uplink transmission;
receive radio resource control (RRC) signaling indicating an allocation cap parameter;
set a maximum number of the plurality of REs to allocate to hybrid automatic repeat request acknowledgement (HARQ-ACK) data based at least in part on the allocation cap parameter;
split at least a portion of the plurality of REs between the HARQ-ACK data, channel state information part 1 (CSI part 1) data, and CSI part 2 data;
generate the uplink transmission based at least in part on the splitting; and
transmit the uplink transmission in the plurality of REs of the uplink shared channel.

34. The apparatus of claim 33, wherein the instructions are further executable by the processor to cause the apparatus to:
calculate a number of the plurality of REs to allocate to the HARQ-ACK data based at least in part on the maximum number.

35. The apparatus of claim 33, wherein the instructions are further executable by the processor to cause the apparatus to:
determine a total number of the plurality of REs that are available for allocation based at least in part on a number of subcarriers associated with the grant and a number of symbol periods associated with the grant.

36. The apparatus of claim 35, wherein the instructions are further executable by the processor to cause the apparatus to:
set the total number of the plurality of REs that are available for allocation as a maximum number of the plurality of REs that are available to allocate to the HARQ-ACK data.

37. The apparatus of claim 35, wherein the instructions to split at least the portion of the plurality of REs are executable by the processor to cause the apparatus to:
allocate a number of the plurality of REs to the HARQ-ACK data;
identify a remaining number of the plurality of REs that are available for allocation based at least in part on determining that the number of the plurality of REs allocated to the HARQ-ACK data is less than the total number of the plurality of REs that are available for allocation; and
split the remaining number of the plurality of REs between the CSI part 1 data and the CSI part 2 data.

38. The apparatus of claim 33, wherein the instructions are further executable by the processor to cause the apparatus to:
  receive the RRC signaling indicating the allocation cap parameter; and
  set a maximum number of the plurality of REs to allocate to the CSI part 1 data based at least in part on the allocation cap parameter.

39. The apparatus of claim 34, wherein the instructions are further executable by the processor to cause the apparatus to:
  calculate a number of the plurality of REs to allocate to the CSI part 1 data based at least in part on the maximum number.

40. The apparatus of claim 33, wherein the instructions to split at least the portion of the plurality of REs are executable by the processor to cause the apparatus to:
  calculate a number of the plurality of REs to allocate to the HARQ-ACK data in proportion to a weighted payload size of the HARQ-ACK data relative to a function of the weighted payload size of the HARQ-ACK data, a weighted payload size of the CSI part 1 data, and a weighted payload size of a reference payload size.

41. The apparatus of claim 33, wherein the instructions to split at least the portion of the plurality of REs are executable by the processor to cause the apparatus to:
  calculate a number of the plurality of REs to allocate to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

42. The apparatus of claim 33, wherein the instructions to split at least the portion of the plurality of REs are executable by the processor to cause the apparatus to:
  receive radio resource control (RRC) signaling indicating a weighting factor for the HARQ-ACK data, a weighting factor for the CSI part 1 data, and a weighting factor for the CSI part 2 data; and
  determine a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

43. The apparatus of claim 33, wherein the instructions to split at least the portion of the plurality of REs are executable by the processor to cause the apparatus to:
  calculate a number of the plurality of REs to allocate to the CSI part 2 data based at least in part on a number of the plurality of REs allocated to the HARQ-ACK data and a number of the plurality of REs allocated to the CSI part 1 data.

44. The apparatus of claim 33, wherein the instructions to split at least the portion of the plurality of REs are executable by the processor to cause the apparatus to:
  calculate a number of the plurality of REs to allocate to the HARQ-ACK data in proportion to a weighted payload size of the HARQ-ACK data relative to a weighted payload size of a reference payload size.

45. The apparatus of claim 33, wherein the instructions to split at least the portion of the plurality of REs are executable by the processor to cause the apparatus to:
  calculate a number of the plurality of REs to allocate to the CSI part 1 data in proportion to a weighted payload size of the CSI part 1 data relative to a weighted payload size of a reference payload size.

46. The apparatus of claim 33, wherein the instructions are further executable by the processor to cause the apparatus to:
  determine a reference payload size based at least on part on a value of a rank indication.

47. The apparatus of claim 33, wherein the instructions are further executable by the processor to cause the apparatus to:
  process the grant to determine that none of the plurality of REs are allocated for transmission of uplink data and that each of the plurality of REs is allocated for transmission of the HARQ-ACK data, or the CSI part 1 data, or the CSI part 2 data.

48. The apparatus of claim 33, wherein the instructions are further executable by the processor to cause the apparatus to:
  process the grant to determine that the uplink transmission is to include non-access stratum data and not to include access stratum data.

49. The apparatus of claim 33, wherein the instructions to split at least the portion of the plurality of REs are executable by the processor to cause the apparatus to:
  split at least the portion of the plurality of REs between the HARQ-ACK data, the CSI part 1 data, the CSI part 2 data, and uplink data based at least in part on a reference payload size of the CSI part 2 data.

50. An apparatus for wireless communication by a base station, comprising:
  a processor;
  memory in electronic communication with the processor; and
  instructions stored in the memory and executable by the processor to cause the apparatus to:
    transmit a grant indicating a plurality of resource elements (REs) of an uplink shared channel allocated to a user equipment (UE) for an uplink transmission;
    transmit radio resource control (RRC) signaling indicating an allocation cap parameter;
    set a maximum number of the plurality of REs available to allocate to hybrid automatic repeat request acknowledgement (HARQ-ACK) data based at least in part on the allocation cap parameter;
    split at least a portion of the plurality of REs between the HARQ-ACK data, channel state information part 1 (CSI part 1) data, and CSI part 2 data; and
    monitor the plurality of REs of the uplink shared channel for the uplink transmission based at least in part on the splitting.

51. The apparatus of claim 50, wherein the instructions to split at least the portion of the plurality of REs are executable by the processor to cause the apparatus to:
  calculate a number of the plurality of REs allocated to the HARQ-ACK data based at least in part on the maximum number of the plurality of REs available to allocate to the HARQ-ACK data.

52. The apparatus of claim 50, wherein the instructions to split at least the portion of the plurality of REs are executable by the processor to cause the apparatus to:
  set a maximum number of the plurality of REs available to allocate to the CSI part 1 data based at least in part on the allocation cap parameter.

53. The apparatus of claim 52, wherein the instructions to split at least the portion of the plurality of REs are executable by the processor to cause the apparatus to:
calculate a number of the plurality of REs allocated to the CSI part 1 data based at least in part on the maximum number of the plurality of REs available to allocate to the CSI part 1 data.

54. The apparatus of claim 50, wherein the instructions are further executable by the processor to cause the apparatus to:
determine a total number of the plurality of REs that are available for allocation based at least in part on a number of subcarriers associated with the grant and a number of symbol periods associated with the grant.

55. The apparatus of claim 54, wherein the instructions to split at least the portion of the plurality of REs are executable by the processor to cause the apparatus to:
split at least the portion of the plurality of REs between the HARQ-ACK data, the CSI part 1 data, and the CSI part 2 data based at least in part on the total number of the plurality of REs that are available for allocation.

56. The apparatus of claim 54, wherein the total number of the plurality of REs that are available for allocation excludes REs of the plurality of REs assigned to at least one reference signal.

57. The apparatus of claim 54, wherein the instructions to transmit the grant further are executable by the processor to cause the apparatus to:
generate the grant to indicate that none of the total number of the plurality of REs are allocated for transmission of uplink data and that each of total number of the plurality of REs is allocated for transmission of the HARQ-ACK data, the CSI part 1 data, or the CSI part 2 data.

58. The apparatus of claim 54, wherein the instructions to transmit the grant further are executable by the processor to cause the apparatus to:
generate the grant to indicate that the uplink transmission is to include non-access stratum data and not to include access stratum data.

59. The apparatus of claim 50, wherein the instructions to split at least the portion of the plurality of REs are executable by the processor to cause the apparatus to:
calculate a number of the plurality of REs allocated to the HARQ-ACK data in proportion to a weighted payload size of the HARQ-ACK data relative to a function of the weighted payload size of the HARQ-ACK data, a weighted payload size of the CSI part 1 data, and a weighted payload size of reference payload size.

60. The apparatus of claim 50, wherein the instructions to split at least the portion of the plurality of REs are executable by the processor to cause the apparatus to:
calculate a number of the plurality of REs allocated to the CSI part 1 data in proportion to a weighted payload size of the CSI part 1 data relative to a function of a weighted payload size of the HARQ-ACK data, the weighted payload size of the CSI part 1 data, and a weighted payload size of a reference payload size.

61. The apparatus of claim 50, wherein the instructions to split at least the portion of the plurality of REs are executable by the processor to cause the apparatus to:
transmit radio resource control (RRC) signaling indicating a weighting factor for the HARQ-ACK data, a weighting factor for the CSI part 1 data, and a weighting factor for the CSI part 2 data; and
determine a weighted payload size of the HARQ-ACK data based at least on part on the weighting factor for the HARQ-ACK data, a weighted payload size of the CSI part 1 data based at least on part on the weighting factor for the CSI part 1 data, and a weighted payload size of a reference payload size based at least on part on the weighting factor for the CSI part 2 data.

62. The apparatus of claim 50, wherein the instructions to split at least the portion of the plurality of REs are executable by the processor to cause the apparatus to:
calculate a number of the plurality of REs allocated to the CSI part 2 data based at least in part on a number of the plurality of REs allocated to the HARQ-ACK data and a number of the plurality of REs allocated to the CSI part 1 data.

63. The apparatus of claim 50, wherein the instructions are further executable by the processor to cause the apparatus to:
determine a reference payload size based at least on part on a value of a rank indication.

64. The apparatus of claim 50, wherein the instructions to split at least the portion of the plurality of REs are executable by the processor to cause the apparatus to:
split at least the portion of the plurality of REs between the HARQ-ACK data, the CSI part 1 data, the CSI part 2 data, and uplink data based at least in part on a reference payload size of the CSI part 2 data.

65. An apparatus for wireless communication by a user equipment (UE), comprising:
means for receiving a grant indicating a plurality of resource elements (REs) of an uplink shared channel allocated to the UE for an uplink transmission;
means for receiving radio resource control (RRC) signaling indicating an allocation cap parameter;
means for setting a maximum number of the plurality of REs to allocate to hybrid automatic repeat request acknowledgement (HARQ-ACK) data based at least in part on the allocation cap parameter;
means for splitting at least a portion of the plurality of REs between the HARQ-ACK data, channel state information part 1 (CSI part 1) data, and CSI part 2 data;
means for generating the uplink transmission based at least in part on the splitting; and
means for transmitting the uplink transmission in the plurality of REs of the uplink shared channel.

66. An apparatus for wireless communication by a base station, comprising:
means for transmitting a grant indicating a plurality of resource elements (REs) of an uplink shared channel allocated to a user equipment (UE) for an uplink transmission;
means for transmitting radio resource control (RRC) signaling indicating an allocation cap parameter;
means for setting a maximum number of the plurality of REs available to allocate to hybrid automatic repeat request acknowledgement (HARQ-ACK) data based at least in part on the allocation cap parameter;
means for splitting at least a portion of the plurality of REs between the HARQ-ACK data, channel state information part 1 (CSI part 1) data, and CSI part 2 data; and
means for monitoring the plurality of REs of the uplink shared channel for the uplink transmission based at least in part on the splitting.

67. A non-transitory computer-readable medium storing code for wireless communication by a user equipment (UE), the code comprising instructions executable by a processor to:
- receive a grant indicating a plurality of REs of an uplink shared channel allocated to the UE for an uplink transmission;
- receive radio resource control (RRC) signaling indicating an allocation cap parameter;
- set a maximum number of the plurality of REs to allocate to hybrid automatic repeat request acknowledgement (HARQ-ACK) data based at least in part on the allocation cap parameter;
- split at least a portion of the plurality of REs between the HARQ-ACK data, channel state information part 1 (CSI part 1) data, and CSI part 2 data;
- generate the uplink transmission based at least in part on the splitting; and
- transmit the uplink transmission in the plurality of REs of the uplink shared channel.

68. A non-transitory computer-readable medium storing code for wireless communication by a base station, the code comprising instructions executable by a processor to:
- transmit a grant indicating a plurality of resource elements (REs) of an uplink shared channel allocated to a user equipment (UE) for an uplink transmission;
- transmit radio resource control (RRC) signaling indicating an allocation cap parameter;
- set a maximum number of the plurality of REs available to allocate to hybrid automatic repeat request acknowledgement (HARQ-ACK) data based at least in part on the allocation cap parameter;
- split at least a portion of the plurality of REs between the HARQ-ACK data, channel state information part 1 (CSI part 1) data, and CSI part 2 data; and
- monitor the plurality of REs of the uplink shared channel for the uplink transmission based at least in part on the splitting.

* * * * *